United States Patent
Choi

(10) Patent No.: US 9,459,753 B2
(45) Date of Patent: Oct. 4, 2016

(54) APPARATUS AND METHOD FOR MULTIMEDIA CONTENT INTERFACE IN IMAGE DISPLAY DEVICE

(71) Applicant: Samsung Electronics Co., Ltd, Gyeonggi-do (KR)

(72) Inventor: Jae-Eun Choi, Gangwon-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 709 days.

(21) Appl. No.: 13/746,281

(22) Filed: Jan. 21, 2013

(65) Prior Publication Data

US 2013/0191747 A1 Jul. 25, 2013

(30) Foreign Application Priority Data

Jan. 20, 2012 (KR) .................. 10-2012-0006674

(51) Int. Cl.
  G06F 3/048 (2013.01)
  G06F 3/0488 (2013.01)
  G06F 3/0485 (2013.01)

(52) U.S. Cl.
  CPC ............ *G06F 3/048* (2013.01); *G06F 3/0485* (2013.01); *G06F 3/0488* (2013.01)

(58) Field of Classification Search
  None
  See application file for complete search history.

(56) References Cited

U.S. PATENT DOCUMENTS

| | | | |
|---|---|---|---|
| 6,486,896 B1* | 11/2002 | Ubillos | G06F 3/04855 715/781 |
| 2004/0234238 A1 | 11/2004 | Yoon et al. | |
| 2007/0168413 A1* | 7/2007 | Barletta | G06F 3/04883 709/203 |
| 2007/0198111 A1 | 8/2007 | Oetzel et al. | |
| 2008/0120647 A1 | 5/2008 | Shin | |
| 2008/0263445 A1* | 10/2008 | Park | G06F 3/0482 715/702 |
| 2009/0228828 A1* | 9/2009 | Beatty | G06F 3/0488 715/786 |
| 2009/0282362 A1 | 11/2009 | Matsumoto | |
| 2010/0226622 A1 | 9/2010 | Morikawa | |
| 2010/0231536 A1* | 9/2010 | Chaudhri | G06F 3/0481 345/173 |
| 2010/0251121 A1* | 9/2010 | Rosser | G11B 27/005 715/720 |
| 2011/0142428 A1* | 6/2011 | Stenberg | G06F 3/04847 386/343 |
| 2011/0161818 A1 | 6/2011 | Viljamaa | |
| 2012/0321281 A1* | 12/2012 | Hilem | H04N 9/8233 386/241 |
| 2013/0152011 A1* | 6/2013 | Pallakoff | G06F 3/0488 715/784 |
| 2013/0328831 A1 | 12/2013 | Homma et al. | |

FOREIGN PATENT DOCUMENTS

| | | |
|---|---|---|
| AU | 2011-101439 A4 | 12/2011 |
| CN | 101751221 A | 6/2010 |
| EP | 1924089 A2 | 5/2008 |
| EP | 2 161 722 A1 | 3/2010 |
| JP | 2006-173796 | 6/2006 |

(Continued)

OTHER PUBLICATIONS

Notice of Patent Grant dated Sep. 30, 2014 in connection with Japanese Patent Application No. 2013-001260; 5 pages.
International Search Report dated Apr. 30, 2013 in connection with International Patent Application No. PCT/KR2013/000339, 3 pages.

(Continued)

*Primary Examiner* — Anil Bhargava

(57) ABSTRACT

An apparatus performs a method for searching a playback timing of multimedia content in an image display device. The method for searching the playback timing includes playing multimedia content, and displaying at least two image navigation bars during the multimedia content playing. The at least two image navigation bars include different searching magnifications.

4 Claims, 18 Drawing Sheets

(56) References Cited

FOREIGN PATENT DOCUMENTS

| JP | 2009-230468 | 10/2009 |
|---|---|---|
| KR | 10-2004-0100636 | 12/2004 |
| KR | 10-2012-0001739 | 1/2012 |

OTHER PUBLICATIONS

Written Opinion of the International Searching Authority dated Apr. 30, 2013, regarding International Patent Application No. PCT/KR2013/000339, 7 pages.
Japanese Office Action dated Jan. 28, 2014 in connection with Japanese Patent Application No. 2013-001260, 5 pages.
First Office Action dated Aug. 4, 2015 in connectin with Chinese Patent Application No. 2013-10014499.7; 27 pages.
Second Office Action dated Mar. 25, 2016 in connection with Chinese Patent Application No. 2013-10014499.7; 14 pages.
Extended European Search Report dated Jun. 2, 2016 in connection with European Appl. No. 13151480.4; 8 pages.
Third Office Action dated Jun. 28, 2016 in connection with Chinese Appl. No. 201310014499.7; 14 pages.

\* cited by examiner

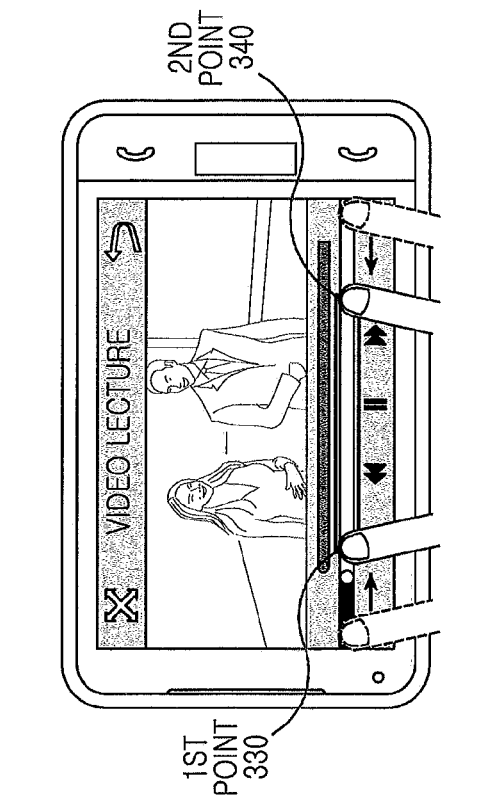
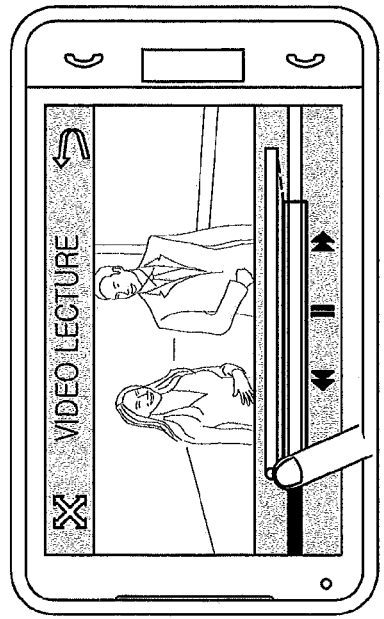
FIG.3B
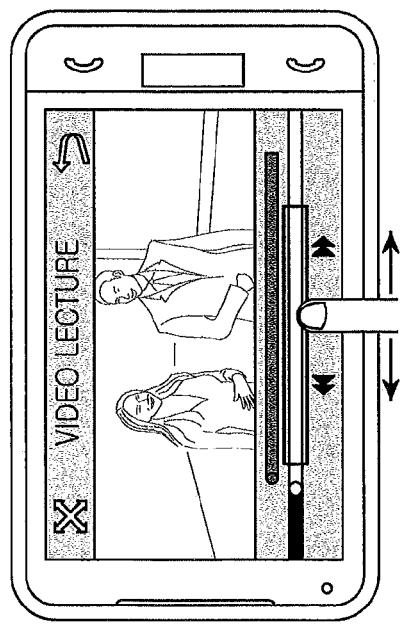
FIG.3D
FIG.3A
FIG.3C

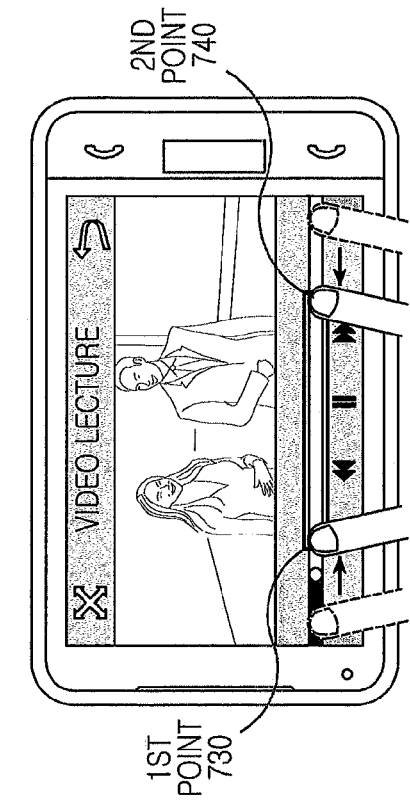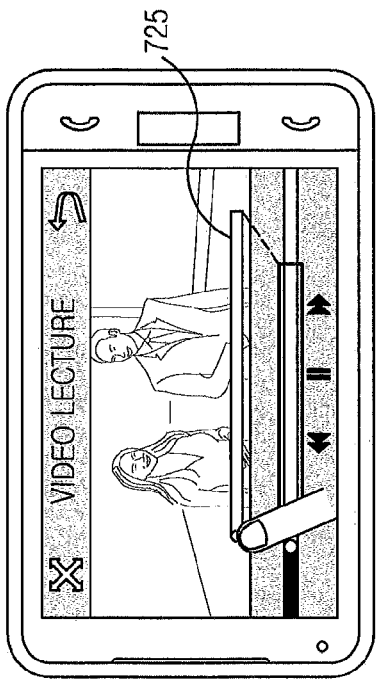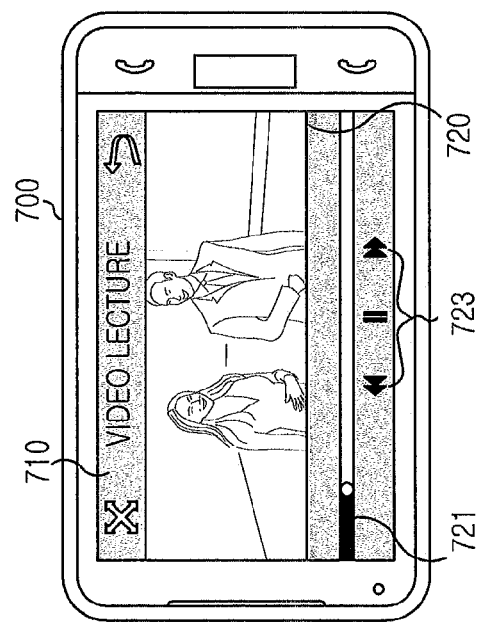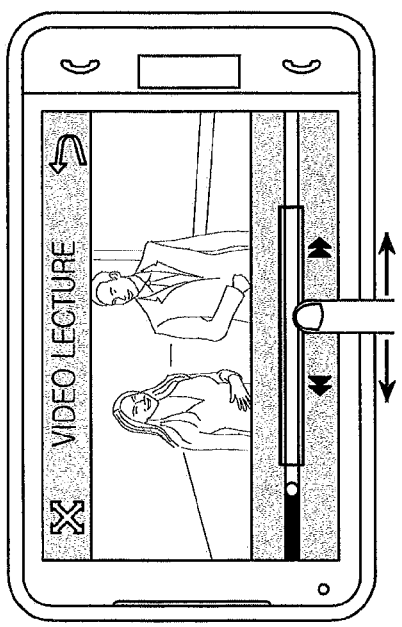

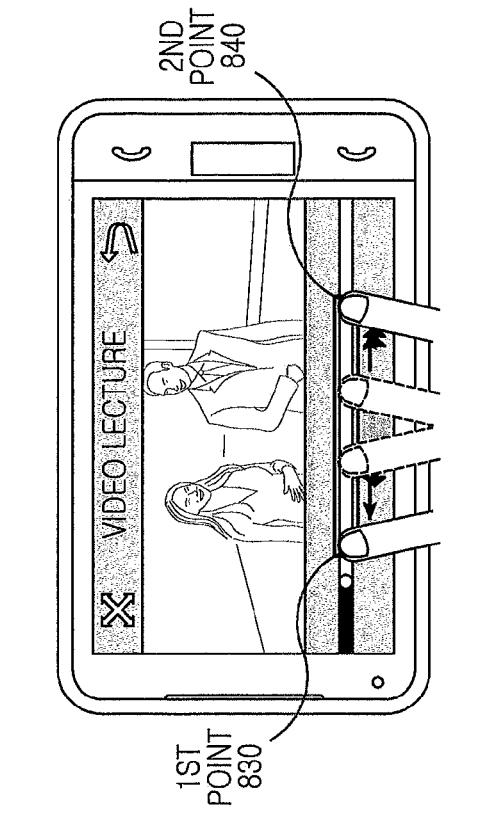
FIG.8A
FIG.8B
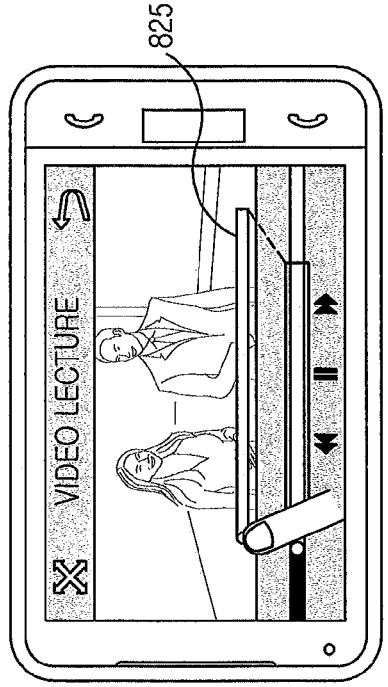
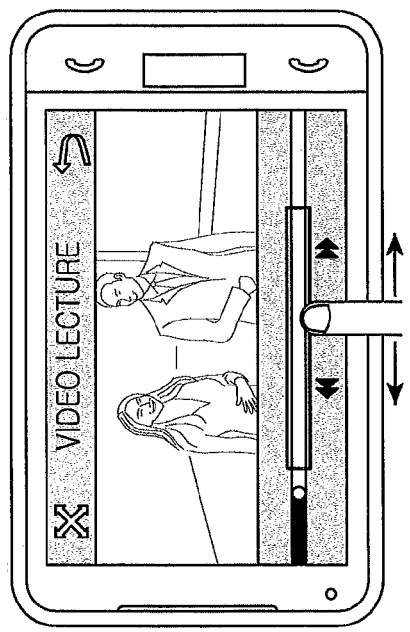
FIG.8C
FIG.8D

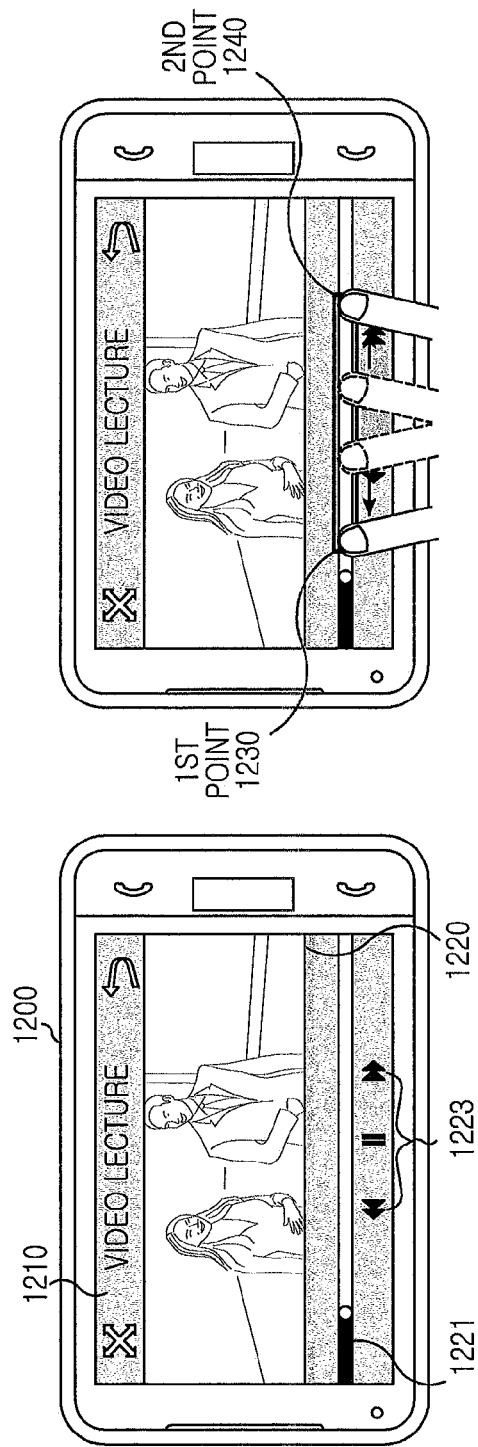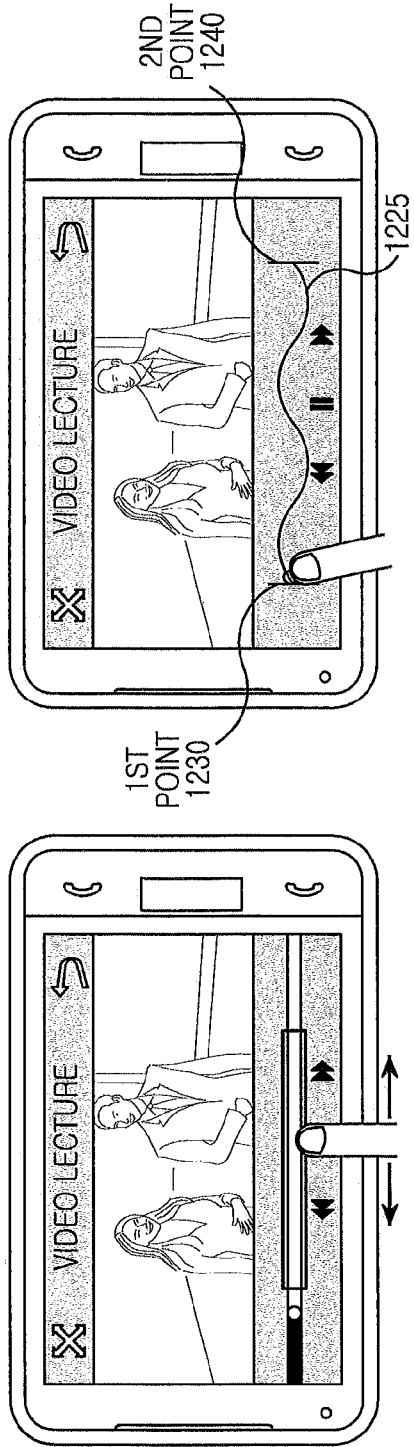

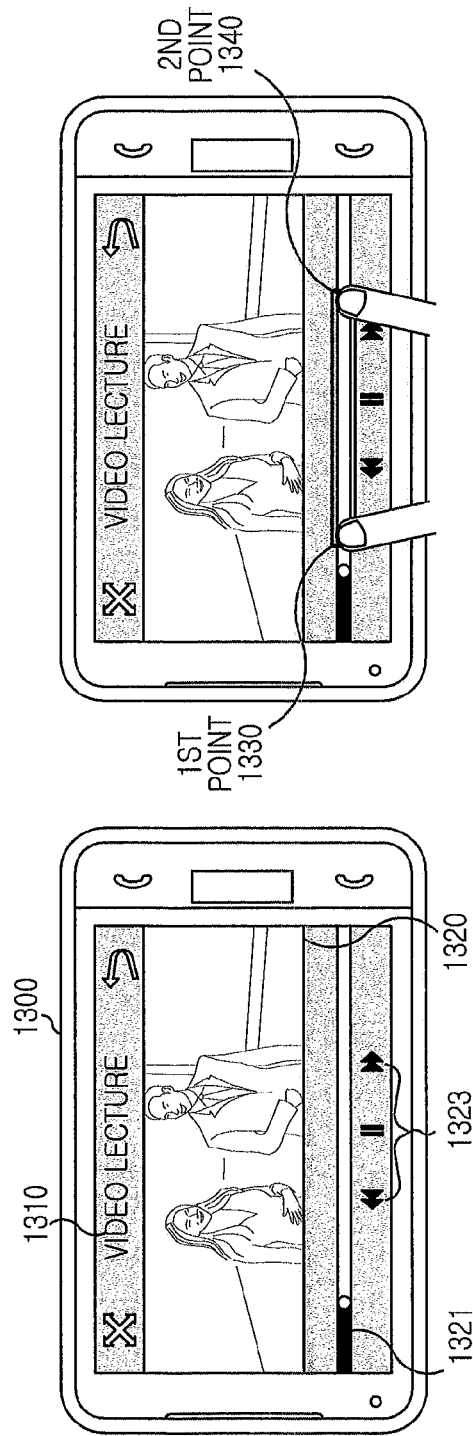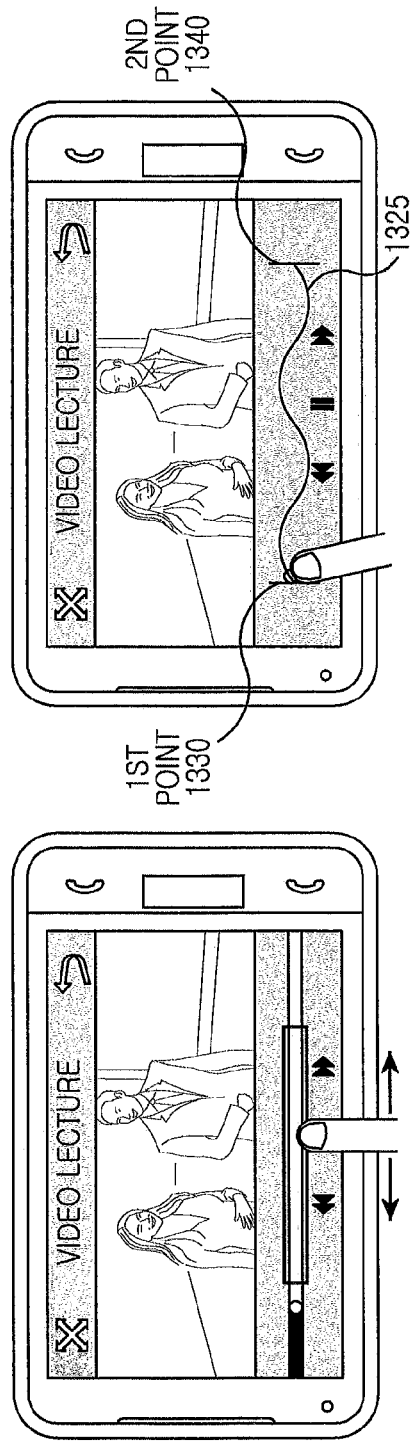

APPARATUS AND METHOD FOR MULTIMEDIA CONTENT INTERFACE IN IMAGE DISPLAY DEVICE

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 20, 2012 and assigned Serial No. 10-2012-0006674, the contents of which are herein incorporated by reference.

TECHNICAL FIELD OF THE INVENTION

The present disclosure relates to an apparatus and method for playing multimedia content in an image display device. More particularly, the present disclosure relates to an apparatus and method for multimedia content interface in the image display device.

BACKGROUND OF THE INVENTION

Portable terminals are evolving into multimedia communication devices providing not only a voice call service but also a data transmission service and various supplementary services. For example, besides the voice call service, the portable terminals may provide a music play service, a messaging service, a camera service, an image play service, and the like.

When playing a video, the portable terminal may display a time navigation bar on a display unit so that a user can arbitrarily choose a playback section of the video.

A size of the display unit in the portable terminal may be somewhat small, such that a length of the time navigation bar displayed on the display unit is restrictive. Accordingly, a problem can occur in which a user of the portable terminal cannot precisely change a playback section of a video through the time navigation bar having the restricted length. Further, a problem can occur in which a user of the portable terminal cannot precisely change the playback section of the video when a playback time of the video is long.

Accordingly, there is a need for a user interface capable of precisely changing a playback section of a video in a portable terminal.

SUMMARY OF THE INVENTION

To address the above-discussed deficiencies of the prior art, it is a primary object to provide an apparatus and method for searching a playback section of multimedia content in an image display device.

Another aspect of the present disclosure is to provide an apparatus and method for precisely searching a playback section of multimedia content in an image display device.

A further aspect of the present disclosure is to provide an apparatus and method for providing a user interface for precisely searching a playback section of multimedia content in an image display device.

Yet another aspect of the present disclosure is to provide an apparatus and method for precisely searching a partial section of a navigation bar navigating a playback section of multimedia content, using a separate precision navigation bar in an image display device.

Still another aspect of the present disclosure is to provide an apparatus and method for precisely searching a playback section of multimedia content according to a specific gesture in an image display device.

Still another aspect of the present disclosure is to provide an apparatus and method for extending a navigation length of a navigation bar navigating a playback section of multimedia content in an image display device.

The above aspects are achieved by providing an apparatus and method for multimedia content interface in an image display device.

According to one aspect of the present disclosure, a method for searching a playback timing of multimedia content in an image display device is provided. The method includes playing multimedia content, and displaying at least two image navigation bars during the multimedia content playing. The at least two image navigation bars include different searching magnifications.

In the one aspect, the displaying of the image navigation bars may include, when a touch on a playback region of the multimedia content is sensed during the multimedia content playing, displaying the at least two image navigation bars.

According to another aspect of the present disclosure, a method for searching a playback timing of multimedia content in an image display device is provided. The method includes playing multimedia content. The method also includes, when a first event occurs during the multimedia content playing, displaying a first image navigation bar, and when a second event occurs during the multimedia content playing, displaying a second image navigation bar. The first image navigation bar and the second image navigation bar include different searching magnifications.

According to a further aspect of the present disclosure, a method for searching a playback timing of multimedia content in an image display device is provided. The method includes playing multimedia content, when a navigation event occurs, displaying an image navigation bar, and when a touch on the image navigation bar is sensed, changing a playback timing of multimedia content according to a preset change interval.

According to yet another aspect of the present disclosure, an image display device includes a touch screen for detecting the presence and location of a touch, and a controller configured to control to display at least two image navigation bars on the touch screen during multimedia content playing. The at least two image navigation bars include different searching magnifications.

In the yet another aspect, when a touch on a playback region of the multimedia content is sensed during the multimedia content playing, the controller may control to display the at least two image navigation bars on the touch screen.

According to still another aspect of the present disclosure, an image display device includes a touch screen configured to detect the presence and location of a touch. The device also includes a controller configured to, when a first event occurs during the multimedia content playing, control to display a first image navigation bar and, when a second event occurs during the multimedia content playing, display a second image navigation bar. The first image navigation bar and the second image navigation bar include different searching magnifications.

According to still another aspect of the present disclosure, an image display device includes a touch screen configured to detect the presence and location of a touch. The device also includes a controller configured to, when a navigation event occurs, display an image navigation bar and, when a touch on the image navigation bar is sensed, change a playback timing of multimedia content according to a preset change interval.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A to 3D are diagrams illustrating screen configurations for activating a precision navigation bar according to a first embodiment of the present disclosure;

FIGS. 7A to 7D are diagrams illustrating screen configurations for displaying a precision navigation bar according to a first embodiment of the present disclosure;

FIGS. 8A to 8D are diagrams illustrating screen configurations for displaying a precision navigation bar according to a second embodiment of the present disclosure;

FIGS. 12A to 12D are diagrams illustrating screen configurations for extending a navigation length of a navigation bar according to a second embodiment of the present disclosure;

FIGS. 13A to 13D are diagrams illustrating screen configurations for extending a navigation length of a navigation bar according to a third embodiment of the present disclosure;

DETAILED DESCRIPTION OF THE INVENTION

FIGS. 1 through 18C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present disclosure will be described herein below with reference to the accompanying drawings. In the following description, well-known functions or constructions are not described in detail since they would obscure the disclosure in unnecessary detail. And terms described below, which are defined considering functions in the present disclosure, can be different depending on user and operator's intention or practice. Therefore, the terms should be defined on the basis of the disclosure throughout this specification.

Below, a description is made for a technology for searching a playback timing of multimedia content in an image display device according to the present disclosure.

In the following description, the image display device may include an electronic device such as a mobile communication terminal capable of playing multimedia content, a Portable Digital Assistant (PDA), a laptop computer, a desktop computer, a smart phone, a netbook, a Mobile Internet Device (MID), a Ultra Mobile Personal Computer (UMPC), a tablet PC, a navigator, an MPEG Audio Layer-3 (MP3), a smart TeleVision (TV) and the like.

Figure 1:
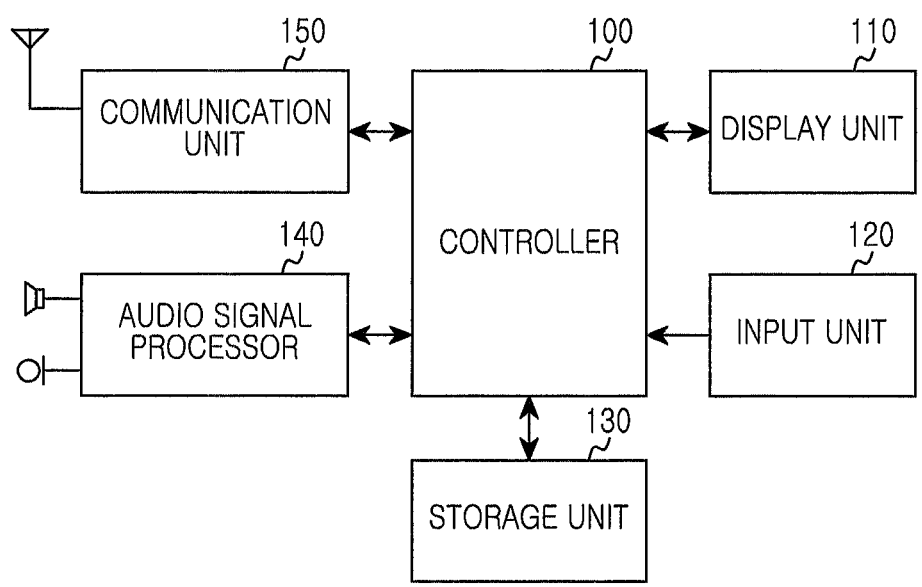
FIG. 1 is a block diagram illustrating a construction of an image display device according to the present disclosure.

FIG. 1 is a block diagram illustrating a construction of an image display device according to the present disclosure.

As illustrated in FIG. 1, the image display device includes a controller 100, a display unit 110, an input unit 120, a storage unit 130, and an audio processor 140.

The controller 100 performs operation control of the image display device.

The controller 100 controls playing of multimedia content. In an embodiment, when a navigation event takes place, the controller 100 displays an image navigation bar 321 in an image navigation region 320 of the display unit 110 as illustrated in FIG. 3A. For example, when a touch is sensed during multimedia content playing, the controller 100 displays the image navigation bar 321 in the image navigation region 320 of the display unit 110.

Also, the controller 100 displays a precision navigation bar for precisely searching a playback timing of multimedia content, and provides a precision search service of the multimedia content. For example, the controller 100 activates precision navigation bars 323, 423, 523, 623 based on touch information on image navigation regions as illustrated in FIG. 3A to FIG. 6D. For another example, the controller 100 may display precision navigation bars 725, 825, 925, 1025 based on touch information on image navigation regions as illustrated in FIG. 7A to FIG. 10D. For further example, the controller 100 may extend lengths 1125, 1225, 1325, 1425, 1823 of image navigation bars based on touch information on image navigation regions as illustrated in FIG. 11A to FIG. 14D and FIG. 18A to FIG. 18C.

The display unit 110 is constructed as a touch screen and provides an output interface and input interface between the image display device and a user. For example, the display unit 110 displays status information of the image display device, character input by the user, moving pictures, still pictures, and the like according to control of the controller 100. For another example, the display unit 110 recognizes user's touch information on a touch sense surface and provides the touch information to the controller 100.

The input unit 120 provides input data generated by user's selection, to the controller 100. For example, the input unit 120 is constructed including a control button for control of the image display device. For another example, the input unit 120 may be constructed as a keypad for receiving provision of input data from the user.

The storage unit 130 may include a program storage unit and a data storage unit. The program storage unit stores a program for controlling an operation of the image display device. The data storage unit stores data generated during program execution. For example, the storage unit 130 can store a program for playing multimedia content and searching a playback timing of the multimedia content. In an embodiment, the controller 100 may control to execute the program stored in the storage unit 130, and play the multimedia content and search for the playback timing of the multimedia content.

The audio processor 140 controls input/output of an audio signal. For example, the audio processor 140 transmits an audio signal provided from the controller 100 to the external through a speaker, and provides an audio signal from a microphone to the controller 100.

Additionally, the image display device may further include a communication unit 150 for processing a signal transmitted/received through an antenna. For example, the communication unit 150 includes an antenna module, a Radio Frequency (RF) processor, an amplifier, a tuner, an oscillator, a digital signal processor, a COder/DECoder (CODEC) and the like. The communication unit 150 can include, without being limited to these, a circuit performing functions of the aforementioned modules.

In the aforementioned embodiment, the controller 100 provides a precision search service of multimedia content using a precision navigation bar.

Figure 16A:
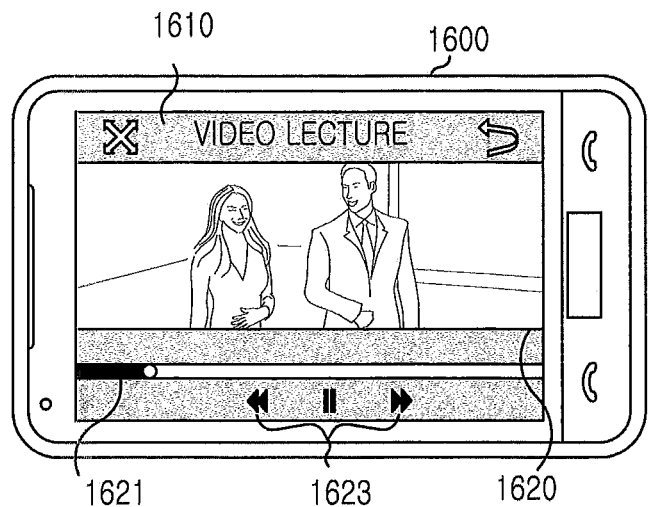
FIGS. 16A to 16C are diagrams illustrating screen configurations for searching a playback timing of a video according to the kind of a gesture according to an embodiment of the present disclosure.
Figure 16B:
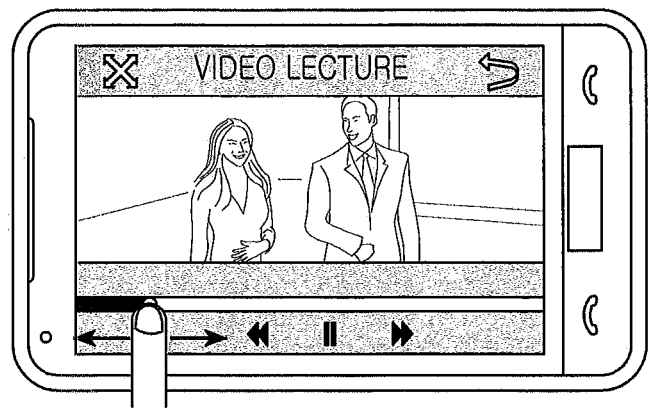
Figure 16C:
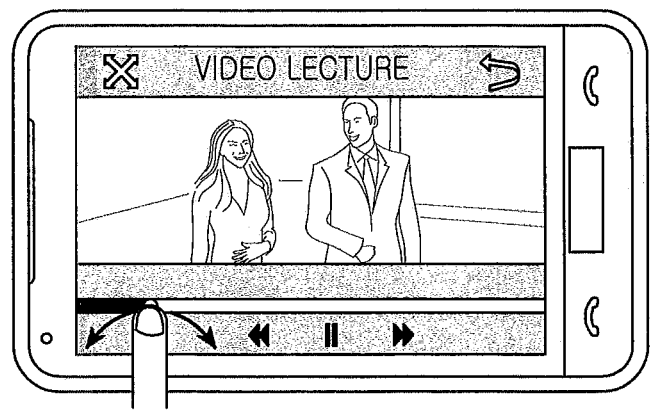

In another embodiment, the controller 100 may precisely search for a playback timing of multimedia content according to the direction of a drag for searching the playback timing of the multimedia content in an image navigation bar as illustrated in FIGS. 16A to 16C.

Figure 2:
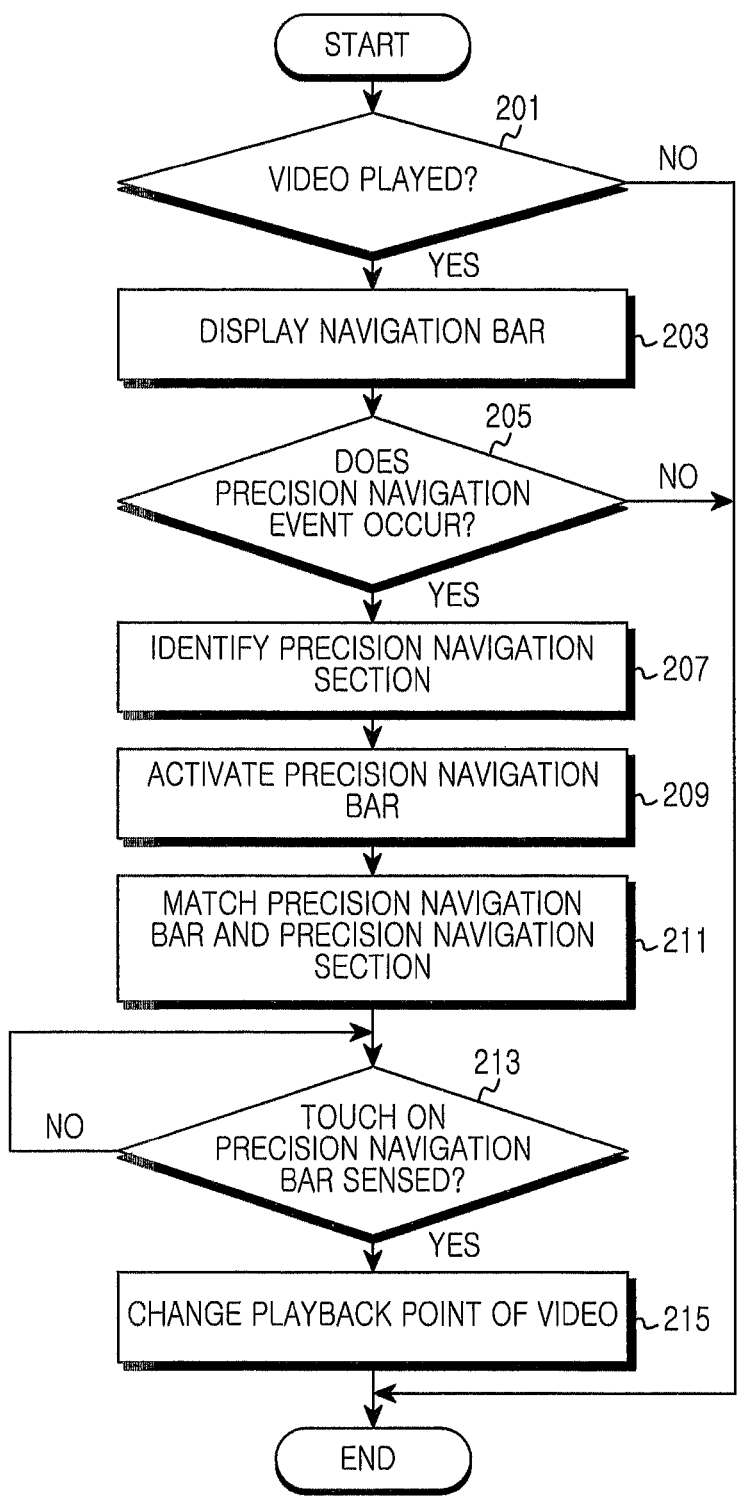
FIG. 2 is a flowchart illustrating a procedure for searching a playback timing of a video using a precision navigation bar in an image display device according to an embodiment of the present disclosure.

FIG. 2 illustrates a procedure for searching a playback timing of a video using a precision navigation bar in an image display device according to an embodiment of the present disclosure.

Referring to FIG. 2, in operation 201, the image display device determines whether to play video content. For example, the image display device determines if the video content for playing is selected by user's manipulation.

If it is determined not to play the video content in operation 201, the image display device terminates the algorithm of the present disclosure.

In contrast, if it is determined to play the video content in operation 201, the image display device proceeds to operation 203 and displays a playback screen for the video content. In an embodiment, according to a navigation event, the image display device may display an image navigation bar 321 together with the video content that is playing on the playback screen as illustrated in FIG. 3A.

After that, the image display device proceeds to operation 205 and determines if a precision navigation event takes place. For example, the image display device determines if a touch on a portion other than the image navigation bar 321 in an image navigation region 320 illustrated in FIG. 3A is sensed. For another example, the image display device determines if the touch on the portion other than the image navigation bar 321 in the image navigation region 320 illustrated in FIG. 3A is held for a reference time or longer.

If it is determined in operation 205 that the precision navigation event does not occur, the image display device terminates the algorithm of the present disclosure. If drag information about the image navigation bar 321 included in the image navigation region 320 is sensed, the image display device may change a playback timing of the video content based on the drag information about the image navigation bar 321.

In contrast, if it is determined in operation 205 that the precision navigation event occurs, the image display device proceeds to operation 207 and identifies a precision navigation section for precision search based on the touch information on the image navigation region. In an embodiment, the image display device may inactivate the image navigation bar 321.

Next, the image display device proceeds to operation 209 and activates a precision navigation bar. For example, the image display device activates precision navigation bars 323, 423, 523, 623 that are in an inactivation state as illustrated in FIG. 3A to FIG. 6D. For another example, the image display device may additionally display precision navigation bars 725, 825, 925, 1025 as illustrated in. FIG. 7A to FIG. 10D. For further example, the image display device may extend and display lengths 1125, 1225, 1325, 1425, 1823 of image navigation bars 1121, 1221, 1321, 1421, 1821 as illustrated in FIG. 11A to FIG. 14D and FIG. 18A to 18C.

After activating the precision navigation bar, the image display device proceeds to operation 211 and matches the precision navigation section to the precision navigation bar.

Next, the image display device proceeds to operation 213 and determines if a touch on the precision navigation bar is sensed.

If it is determined in operation 213 that the touch on the precision navigation bar is sensed, the image display device proceeds to operation 215 and changes a playback point of the video content based on touch information on the precision navigation bar. For example, when drag information about the precision navigation bar is sensed, the image display device changes the playback point of the video content according to drag direction and distance. For another example, if any point of the precision navigation bar is touched, the image display device may change the playback point of the video content based on the touch point of the precision navigation bar.

After that, the image display device terminates the algorithm of the present disclosure.

As described above, an image display device precisely searches for a playback timing of video content using a precision navigation bar matched with a partial section of an image navigation bar. In an embodiment, the image display device has an advantage of being capable of precisely searching the playback timing of the video content included in the precision navigation section as a length of the precision navigation section is shorter than a length of the precision navigation bar.

Below, a description is made for a screen configuration for searching a video playback timing using a precision navigation bar in an image display device.

FIGS. 3A to 3D illustrate screen configurations for activating a precision navigation bar according to a first embodiment of the present disclosure.

If an image display device plays video content, the image display device displays a playback screen 300 of the video content on a display unit 110 as illustrated in FIG. 3A. In an embodiment, when a navigation event takes place, the image display device displays an image information region 310 and an image navigation region 320 on the display unit 110 as illustrated in FIG. 3A. Here, the image navigation region 320 includes an image navigation bar 321, a precision navigation bar 323, and an image navigation button 325. In an embodiment, the precision navigation bar 323 keeps an inactivation state.

If a precision search event occurs, the image display device determines a precision navigation section ranging from a first point 330 to a second point 340, based on drag information of the image navigation bar 321 as illustrated in FIG. 3B. In detail, the image display device sets the first point 330 according to drag information generated from the left end of the image navigation bar 321, and sets the second point 340 according to drag information generated from the right end of the image navigation bar 321. In an embodiment, the image display device sets the precision navigation section ranging from the first point 330 to the second point 340, based on the first point 330 and the second point 340.

After identifying the precision navigation section ranging from the first point 330 to the second point 340, the image display device activates the precision navigation bar 323 as illustrated in FIG. 3D and matches the precision navigation bar 323 with the precision navigation section ranging from the first point 330 to the second point 340. After that, the image display device can search for a playback timing of the video content included in the precision navigation section ranging from the first point 330 to the second point 340, based on touch information on the precision navigation bar 323.

As described above, an image display device sets an image navigation section ranging from a first point 330 to a second point 340, according to drag information about an image navigation bar 321. In an embodiment, as illustrated in FIG. 3C, the image display device may change a position of the precision navigation section ranging from the first point 330 to the second point 340, based on touch information on the precision navigation section ranging from the first point 330 to the second point 340 of the image navigation bar 321. For example, when a touch on the precision navigation section ranging from the first point 330 to the second point 340 in the image navigation bar 321 is held for a reference time or longer, the image display device activates a precision navigation section shift mode. After that, the image display device changes the position of the precision navigation section ranging from the first point 330 to the second point 340 to the left or right, based on drag information about the precision navigation section ranging from the first point 330 to the second point 340.

FIGS. 4A to 4D illustrate screen configurations for activating a precision navigation bar according to a second embodiment of the present disclosure.

Figure 4B:
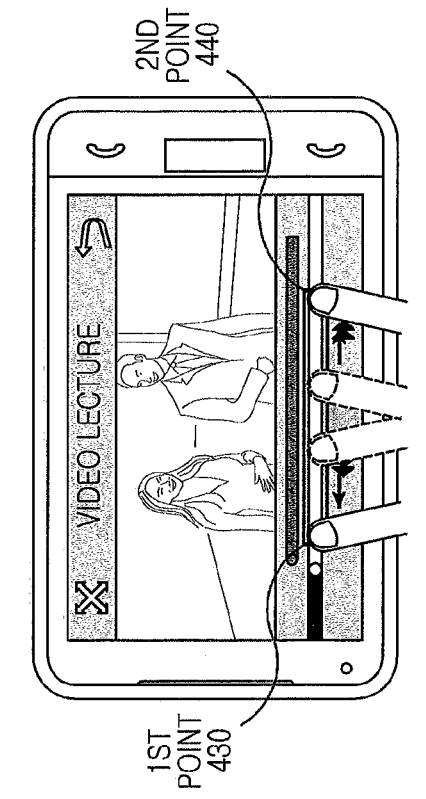
FIGS. 4A to 4D are diagrams illustrating screen configurations for activating a precision navigation bar according to a second embodiment of the present disclosure.
Figure 4D:
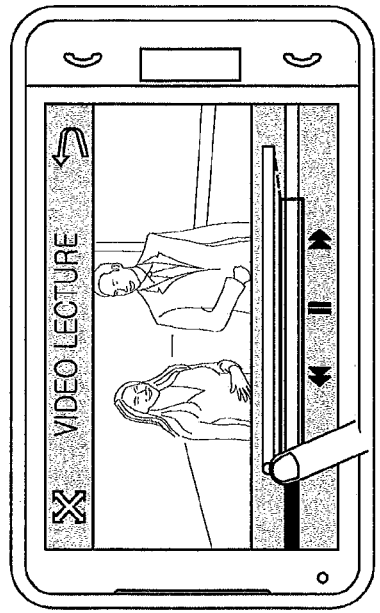
Figure 4A:
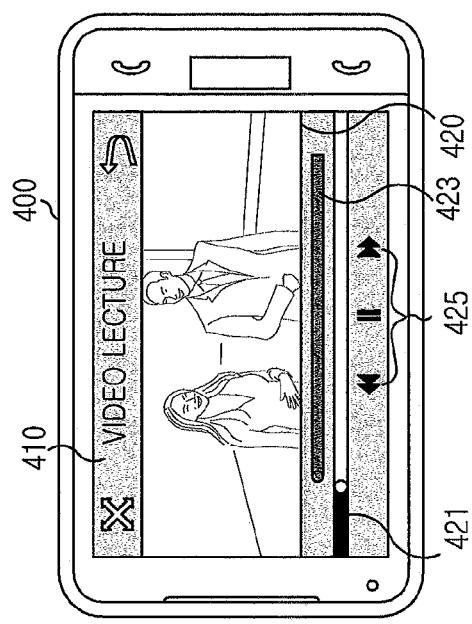

If an image display device plays video content, the image display device displays a playback screen 400 of the video content on a display unit 110 as illustrated in FIG. 4A. In an embodiment, when a navigation event takes place, the image display device displays an image information region 410 and an image navigation region 420 on the display unit 110 as illustrated in FIG. 4A. Here, the image navigation region 420 includes an image navigation bar 421, a precision navigation bar 423, and an image navigation button 425. In an embodiment, the precision navigation bar 423 keeps an inactivation state.

If a precision search event occurs, the image display device determines a precision navigation section ranging from a first point 430 to a second point 440, based on drag information of the image navigation bar 421 as illustrated in FIG. 4B. In detail, the image display device sets the first point 430 according to drag information generated from a reference point of the image navigation bar 421 to the left side thereof, and sets the second point 440 according to drag information generated from a reference point of the image navigation bar 421 to the right side thereof. In an embodiment, the image display device sets the precision navigation section ranging from the first point 430 to the second point 440, based on the first point 430 and the second point 440. Here, the reference point represents at least one first touch point of a user for setting the precision navigation section in the image navigation bar 421.

After identifying the precision navigation section ranging from the first point 430 to the second point 440, the image display device activates the precision navigation bar 423 as illustrated in FIG. 4D and matches the precision navigation bar 423 with the precision navigation section ranging from the first point 430 to the second point 440. After that, the image display device can search for a playback timing of the video content included in the precision navigation section ranging from the first point 430 to the second point 440, based on touch information on the precision navigation bar 423.

Figure 4C:
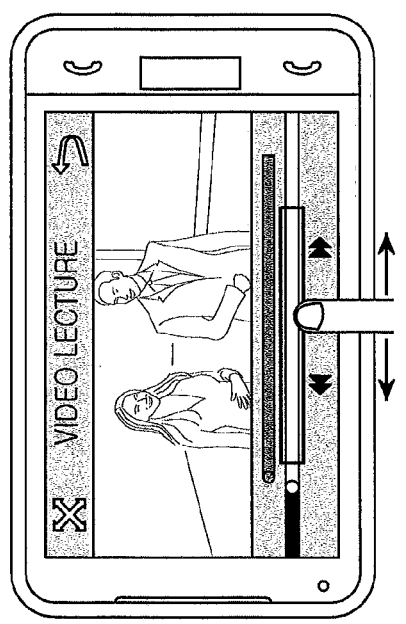

As described above, an image display device sets an image navigation section ranging from a first point 430 to a second point 440, according to drag information about an image navigation bar 421. In an embodiment, as illustrated in FIG. 4C, the image display device may change a position of the precision navigation section ranging from the first point 430 to the second point 440, based on touch information on the precision navigation section ranging from the first point 430 to the second point 440 of the image navigation bar 421. For example, when a touch on the precision navigation section ranging from the first point 430 to the second point 440 in the image navigation bar 421 is held for a reference time or longer, the image display device activates a precision navigation section shift mode. After that, the image display device changes the position of the precision navigation section ranging from the first point 430 to the second point 440 to the left or right, based on drag information about the precision navigation section ranging from the first point 430 to the second point 440.

FIGS. 5A to 5D illustrate screen configurations for activating a precision navigation bar according to a third embodiment of the present disclosure.

Figure 5A:
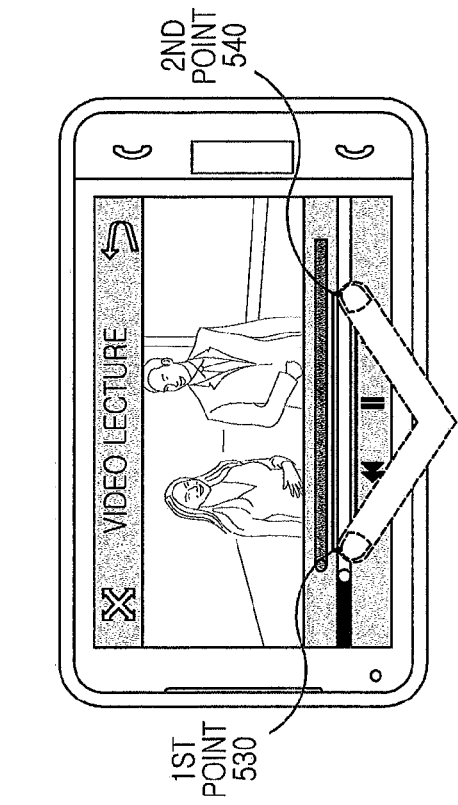
FIGS. 5A to 5D are diagrams illustrating screen configurations for activating a precision navigation bar according to a third embodiment of the present disclosure.

If an image display device plays video content, the image display device displays a playback screen 500 of the video content on a display unit 110 as illustrated in FIG. 5A. In an embodiment, when a navigation event takes place, the image display device displays an image information region 510 and an image navigation region 520 on the display unit 110 as illustrated in FIG. 5A. Here, the image navigation region 520 includes an image navigation bar 521, a precision navigation bar 523, and an image navigation button 525. In an embodiment, the precision navigation bar 523 keeps an inactivation state.

Figure 5B:
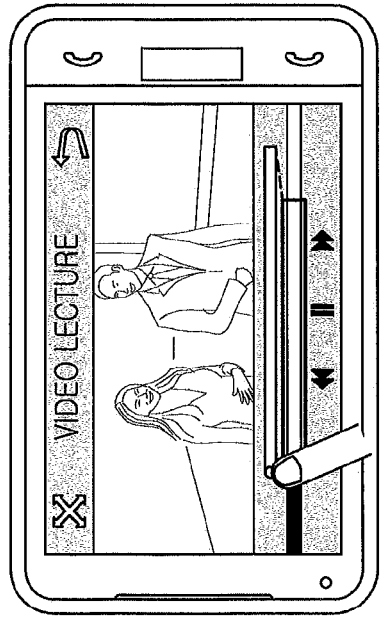

If a precision search event occurs, the image display device determines a precision navigation section ranging from a first point 530 to a second point 540, based on multi touch information of the image navigation bar 521 as illustrated in FIG. 5B. In detail, the image display device sets the precision navigation section ranging from the first point 530 to the second point 540, based on the first point 530 and the second point 540 that are touch points of the image navigation bar 521.

Figure 5C:
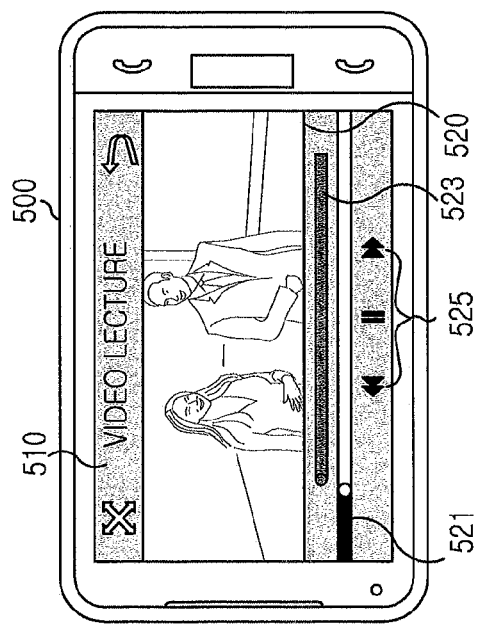
Figure 5D:
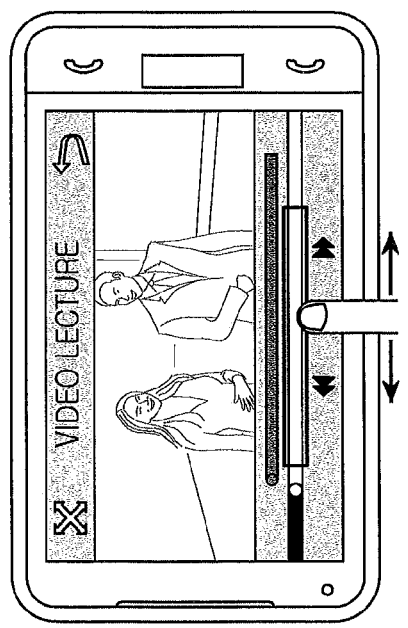

After identifying the precision navigation section ranging from the first point 530 to the second point 540, the image display device activates the precision navigation bar 523 as illustrated in FIG. 5D and matches the precision navigation bar 523 with the precision navigation section ranging from the first point 530 to the second point 540. After that, the image display device can search for a playback timing of the video content included in the precision navigation section ranging from the first point 530 to the second point 540, based on touch information on the precision navigation bar 523.

As described above, an image display device sets an image navigation section ranging from a first point 530 to a second point 540, according to multi touch information about an image navigation bar 521. In an embodiment, as illustrated in FIG. 5C, the image display device may change a position of the precision navigation section ranging from the first point 530 to the second point 540, based on touch information on the precision navigation section ranging from the first point 530 to the second point 540 of the image navigation bar 521. For example, when a touch on the precision navigation section ranging from the first point 530 to the second point 540 of the image navigation bar 521 is held for a reference time or longer, the image display device activates a precision navigation section shift mode. After that, the image display device changes the position of the precision navigation section ranging from the first point 530 to the second point 540 to the left or right, based on drag information about the precision navigation section ranging from the first point 530 to the second point 540.

FIGS. 6A to 6D illustrate screen configurations for activating a precision navigation bar according to a fourth embodiment of the present disclosure.

Figure 6A:
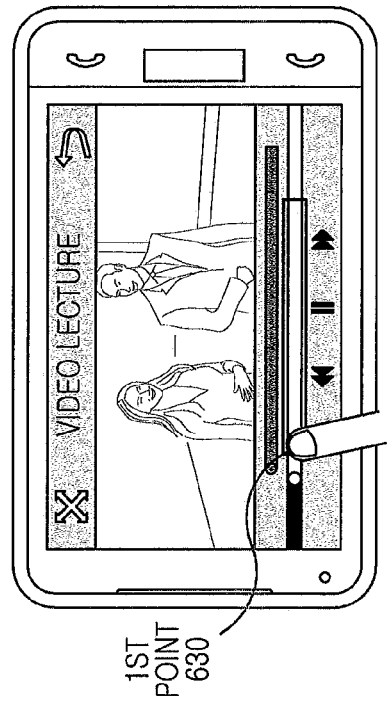
FIGS. 6A to 6D are diagrams illustrating screen configurations for activating a precision navigation bar according to a fourth embodiment of the present disclosure.

If an image display device plays video content, the image display device displays a playback screen 600 of the video content on a display unit 110 as illustrated in FIG. 6A. In an embodiment, when a navigation event takes place, the image display device displays an image information region 610 and an image navigation region 620 on the display unit 110 as illustrated in FIG. 6A. Here, the image navigation region 620 includes an image navigation bar 621, a precision navigation bar 623, and an image navigation button 625. In an embodiment, the precision navigation bar 623 keeps an inactivation state.

Figure 6B:
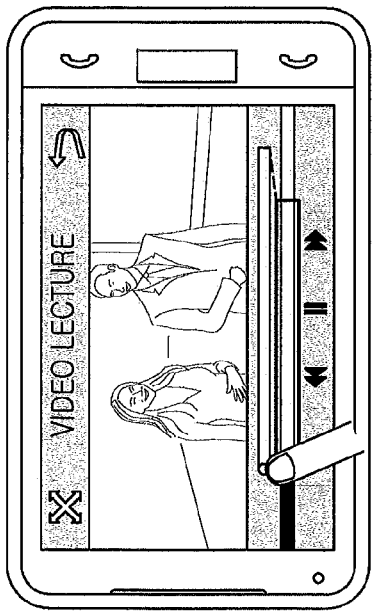
Figure 6C:
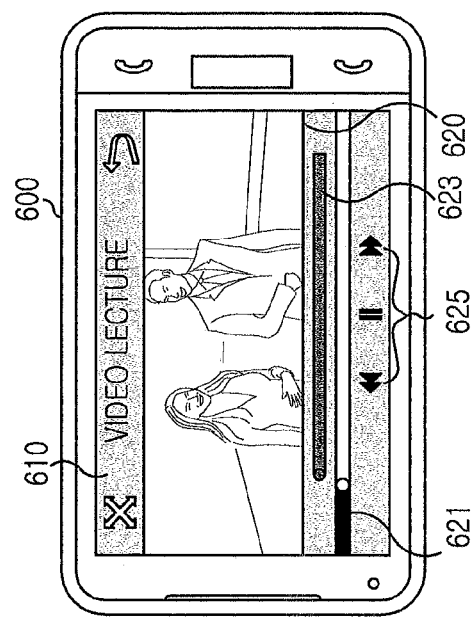

If a precision search event occurs, the image display device determines a precision navigation section ranging from a first touch point 630 to a second touch point 640, based on touch information of the image navigation bar 621 as illustrated in FIG. 6B and FIG. 6C. In detail, the image display device sets the precision navigation section ranging from the first point 630 to the second point 640, based on the first touch point 630 of the image navigation bar 621 illustrated in FIG. 6B and the second touch point 640 of the image navigation bar 621 illustrated in FIG. 6C.

Figure 6D:
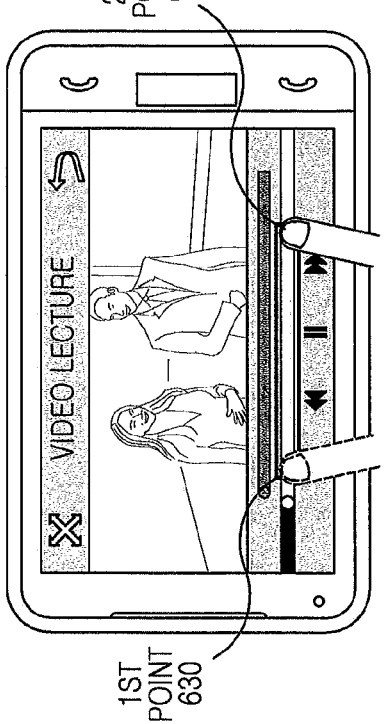

After identifying the precision navigation section ranging from the first touch point 630 to the second touch point 640, the image display device activates the precision navigation bar 623 as illustrated in FIG. 6D and matches the precision navigation bar 623 with the precision navigation section ranging from the first touch point 630 to the second touch point 640. After that, the image display device can search for a playback timing of the video content included in the precision navigation section ranging from the first touch point 630 to the second touch point 640, based on touch information on the precision navigation bar 623.

As described above, an image display device sets an image navigation section ranging from a first touch point 630 to a second touch point 640, based on touch information sensed a number of times about an image navigation bar 621. In an embodiment, the image display device can change a position of the precision navigation section ranging from the first touch point 630 to the second touch point 640, based on touch information on the precision navigation section ranging from the first touch point 630 to the second touch point 640 of the image navigation bar 621. For example, when a touch on the precision navigation section ranging from the first touch point 630 to the second touch point 640 of the image navigation bar 621 is held for a reference time or longer, the image display device activates a precision navigation section shift mode. After that, the image display device changes the position of the precision navigation section ranging from the first touch point 630 to the second touch point 640 to the left or right, based on drag information about the precision navigation section ranging from the first touch point 630 to the second touch point 640.

In FIGS. 3A to 6D, after activating precision navigation bars 323, 423, 523, 623, an image display device matches precision navigation sections ranging from points 330 to 340, points 430 to 440, points 530 to 540, and points 630 to 640, to the precision navigation bars 323, 423, 523, 623.

In another embodiment, after matching precision navigation sections ranging from points 330 to 340, points 430 to 440, points 530 to 540, and points 630 to 640 to precision navigation bars 323, 423, 523, 623, an image display device may activate the precision navigation bars 323, 423, 523, 623.

In the aforementioned embodiment, when a navigation event occurs, an image display device displays image navigation regions 320, 420, 520, 620 including image navigation bars 321, 421, 521, 621 and precision navigation bars 323, 423, 523, 623, on a display unit 110.

In another embodiment, after identifying a precision navigation region, an image display device may display a precision navigation bar on a display unit 110 as illustrated in FIG. 7A to FIG. 10D below.

FIGS. 7A to 7D illustrate screen configurations for displaying a precision navigation bar according to a first embodiment of the present disclosure.

If an image display device plays video content, the image display device displays a playback screen 700 of the video content on a display unit 110 as illustrated in FIG. 7A. In an embodiment, when a navigation event takes place, the image display device displays an image information region 710 and an image navigation region 720 on the display unit 110 as illustrated in FIG. 7A. Here, the image navigation region 720 includes an image navigation bar 721 and an image navigation button 723.

If a precision search event occurs, the image display device determines a precision navigation section ranging from a first point 730 to a second point 740, based on drag information of the image navigation bar 721 as illustrated in FIG. 7B. In detail, the image display device sets the first point 730 according to drag information generated from the left end of the image navigation bar 721, and sets the second point 740 according to drag information generated from the right end of the image navigation bar 721. In an embodiment, the image display device sets the precision navigation section ranging from the first point 730 to the second point 740, based on the first point 730 and the second point 740.

After identifying the precision navigation section ranging from the first point 730 to the second point 740, the image display device displays the precision navigation bar 725, which is matched with the precision navigation section ranging from the first point 730 to the second point 740, on the display unit 110 as illustrated in FIG. 7D. After that, the image display device can search for a playback timing of the video content included in the precision navigation section ranging from the first point 730 to the second point 740, based on touch information on the precision navigation bar 725.

As described above, an image display device sets an image navigation section ranging from a first point 730 to a second point 740, according to drag information about an image navigation bar 721. In an embodiment, as illustrated in FIG. 7C, the image display device can change a position of the precision navigation section ranging from the first point 730 to the second point 740, based on touch information on the precision navigation section ranging from the first point 730 to the second point 740 of the image navigation bar 721. For example, when a touch on the precision navigation section ranging from the first point 730 to the second point 740 in the image navigation bar 721 is held for a reference time or longer, the image display device activates a precision navigation section shift mode. After that, the image display device changes the position of the precision navigation section ranging from the first point 730 to the second point 740 to the left or right, based on drag information about the precision navigation section ranging from the first point 730 to the second point 740.

FIGS. 8A to 8D illustrate screen configurations for displaying a precision navigation bar according to a second embodiment of the present disclosure.

If an image display device plays video content, the image display device displays a playback screen 800 of the video content on a display unit 110 as illustrated in FIG. 8A. In an embodiment, when a navigation event takes place, the image display device displays an image information region 810 and an image navigation region 820 on the display unit 110 as illustrated in FIG. 8A. Here, the image navigation region 820 includes an image navigation bar 821 and an image navigation button 823.

If a precision search event occurs, the image display device determines a precision navigation section ranging from a first point 830 to a second point 840, based on drag information of the image navigation bar 821 as illustrated in FIG. 8B. In detail, the image display device sets the first point 830 according to drag information generated from a reference point of the image navigation bar 821 to the left side thereof, and sets the second point 840 according to drag information generated from the reference point of the image navigation bar 821 to the right side thereof. In an embodiment, the image display device sets the precision navigation section ranging from the first point 830 to the second point 840, based on the first point 830 and the second point 840. Here, the reference point represents at least one first touch point of a user for setting the precision navigation section in the image navigation bar 821.

After identifying the precision navigation section ranging from the first point 830 to the second point 840, the image display device displays the precision navigation bar 825, which is matched with the precision navigation section ranging from the first point 830 to the second point 840, on the display unit 110 as illustrated in FIG. 8D. After that, the image display device can search for a playback timing of the video content included in the precision navigation section ranging from the first point 830 to the second point 840, based on touch information on the precision navigation bar 825.

As described above, an image display device sets an image navigation section ranging from a first point 830 to a second point 840, based on drag information about an image navigation bar 821. In an embodiment, as illustrated in FIG. 8C, the image display device can change a position of the precision navigation section ranging from the first point 830 to the second point 840, based on touch information on the precision navigation section ranging from the first point 830 to the second point 840 of the image navigation bar 821. For example, when a touch on the precision navigation section ranging from the first point 830 to the second point 840 in the image navigation bar 821 is held for a reference time or longer, the image display device activates a precision navigation section shift mode. After that, the image display device changes the position of the precision navigation section ranging from the first point 830 to the second point 840 to the left or right, according to drag information about the precision navigation section ranging from the first point 830 to the second point 840.

FIGS. 9A to 9D illustrate screen configurations for displaying a precision navigation bar according to a third embodiment of the present disclosure.

Figure 9A:
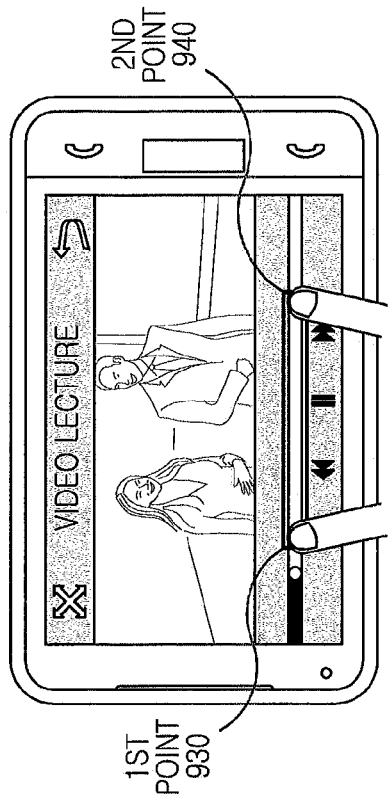
FIGS. 9A to 9D are diagrams illustrating screen configurations for displaying a precision navigation bar according to a third embodiment of the present disclosure.

If an image display device plays video content, the image display device displays a playback screen 900 of the video content on a display unit 110 as illustrated in FIG. 9A. In an embodiment, when a navigation event takes place, the image display device displays an image information region 910 and an image navigation region 920 on the display unit 110 as illustrated in FIG. 9A. Here, the image navigation region 920 includes an image navigation bar 921 and an image navigation button 923.

Figure 9B:
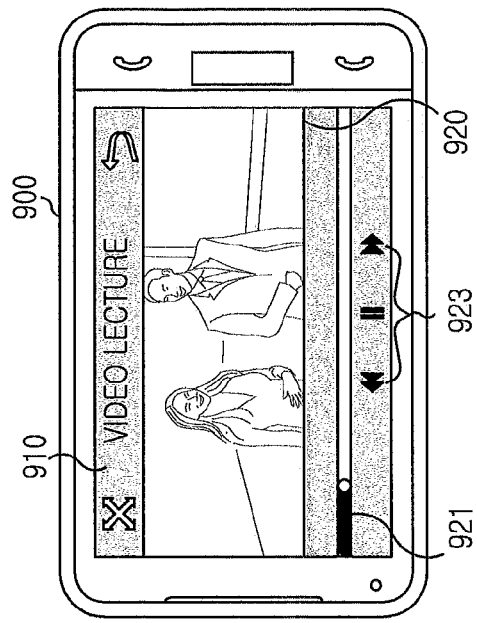

If a precision search event occurs, the image display device determines a precision navigation section ranging from a first point 930 to a second point 940, based on multi touch information of the image navigation bar 921 as illustrated in FIG. 9B. In detail, the image display device sets the precision navigation section ranging from the first point 930 to the second point 940, based on the first point 930 and the second point 940 that are multi touch points of the image navigation bar 921.

Figure 9C:
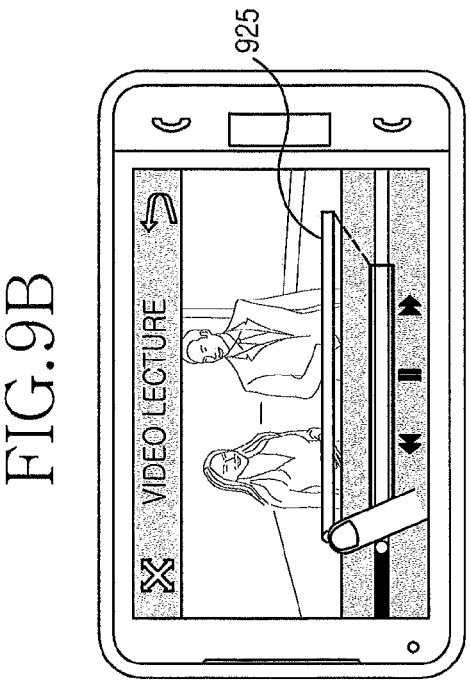
Figure 9D:
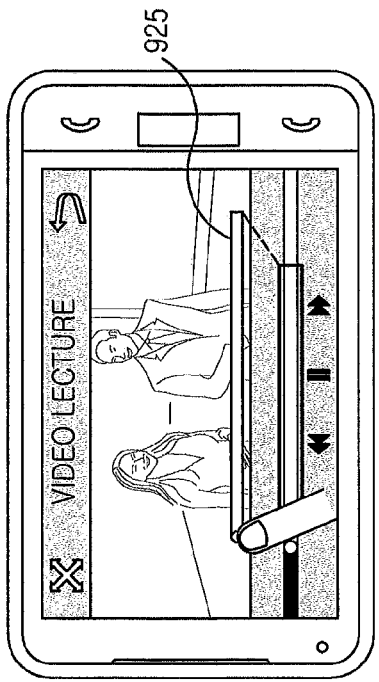

After identifying the precision navigation section ranging from the first point 930 to the second point 940, the image display device displays the precision navigation bar 925, which is matched with the precision navigation section ranging from the first point 930 to the second point 940, on the display unit 110 as illustrated in FIG. 9D. After that, the image display device can search for a playback timing of the video content included in the precision navigation section ranging from the first point 930 to the second point 940, based on touch information on the precision navigation bar 925.

As described above, an image display device sets an image navigation section ranging from a first point 930 to a second point 940, based on multi touch information about an image navigation bar 921. In an embodiment, as illustrated in FIG. 9C, the image display device can change a position of the precision navigation section ranging from the first point 930 to the second point 940, based on touch information on the precision navigation section ranging from the first point 930 to the second point 940 of the image navigation bar 921. For example, when a touch on the precision navigation section ranging from the first point 930 to the second point 940 of the image navigation bar 921 is held for a reference time or longer, the image display device activates a precision navigation section shift mode. After that, the image display device changes the position of the precision navigation section ranging from the first point 930 to the second point 940 to the left or right, according to drag information about the precision navigation section ranging from the first point 930 to the second point 940.

FIGS. 10A to 10D illustrate screen configurations for displaying a precision navigation bar according to a fourth embodiment of the present disclosure.

Figure 10A:
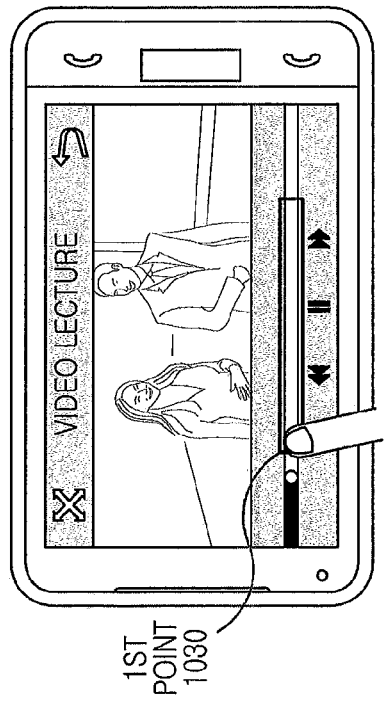
FIGS. 10A to 10D are diagrams illustrating screen configurations for displaying a precision navigation bar according to a fourth embodiment of the present disclosure.

If an image display device plays video content, the image display device displays a playback screen 1000 of the video content on a display unit 110 as illustrated in FIG. 10A. In an embodiment, when a navigation event takes place, the image display device displays an image information region 1010 and an image navigation region 1020 on the display unit 110 as illustrated in FIG. 10A. Here, the image navigation region 1020 includes an image navigation bar 1021 and an image navigation button 1023.

Figure 10B:
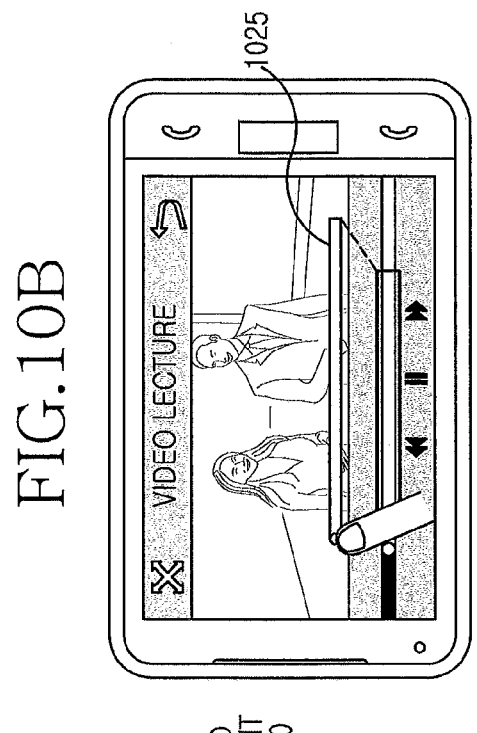
Figure 10C:
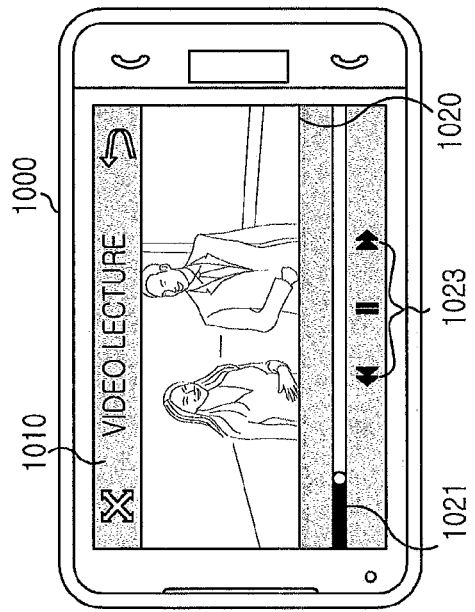
Figure 10D:
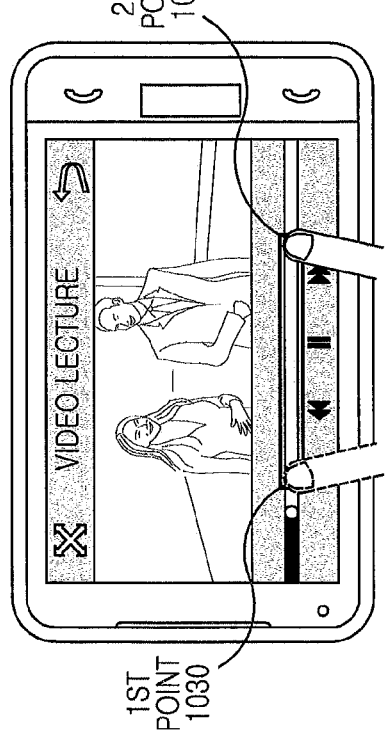

If a precision search event occurs, the image display device determines a precision navigation section ranging from a first touch point 1030 to a second touch point 1040, based on touch information of the image navigation bar 1021 as illustrated in FIG. 10B and FIG. 10C. In detail, the image display device sets the precision navigation section ranging from the first point 1030 to the second point 1040, based on the first touch point 1030 of the image navigation bar 1021 illustrated in FIG. 10B and the second touch point 1040 of the image navigation bar 1021 illustrated in FIG. 10C.

After identifying the precision navigation section ranging from the first touch point 1030 to the second touch point 1040, the image display device displays the precision navigation bar 1025 matched with the precision navigation section ranging from the first touch point 1030 to the second touch point 1040, on the display unit 110. After that, the image display device can search for a playback timing of the video content included in the precision navigation section ranging from the first touch point 1030 to the second touch point 1040, based on touch information on the precision navigation bar 1025.

As described above, an image display device sets an image navigation section ranging from a first touch point 1030 to a second touch point 1040, based on a number of times touch information is received about an image navigation bar 1021. In an embodiment, the image display device can change a position of the precision navigation section ranging from the first touch point 1030 to the second touch point 1040, based on touch information on the precision navigation section ranging from the first touch point 1030 to the second touch point 1040 of the image navigation bar 10211. For example, when a touch on the precision navigation section ranging from the first touch point 1030 to the second touch point 1040 of the image navigation bar 1021 is held for a reference time or longer, the image display device activates a precision navigation section shift mode. After that, the image display device changes the position of the precision navigation section ranging from the first touch point 1030 to the second touch point 1040 to the left or right, based on drag information about the precision navigation section ranging from the first touch point 1030 to the second touch point 1040.

In the aforementioned embodiment, an image display device displays a precision navigation bar on a display unit 110 after identifying a precision navigation region.

In another embodiment, an image display device may extend a navigation length of a precision navigation region after identifying the precision navigation region as illustrated in FIG. 11A to FIG. 14D below.

FIGS. 11A to 11D illustrate screen configurations for extending a navigation length of a navigation bar according to a first embodiment of the present disclosure.

Figure 11A:
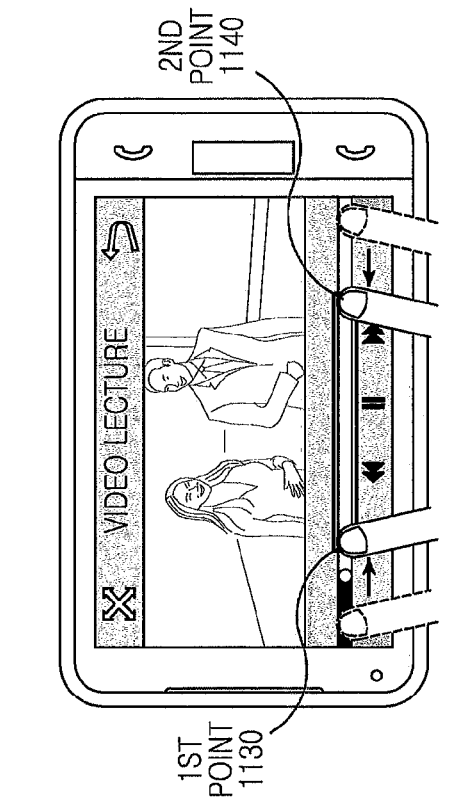
FIGS. 11A to 11D are diagrams illustrating screen configurations for extending a navigation length of a navigation bar according to a first embodiment of the present disclosure.

If an image display device plays video content, the image display device displays a playback screen 1100 of the video content on a display unit 110 as illustrated in FIG. 11A. In an embodiment, when a navigation event takes place, the image display device displays an image information region 1110 and an image navigation region 1120 on the display unit 110 as illustrated in FIG. 11A. Here, the image navigation region 1120 includes an image navigation bar 1121 and an image navigation button 1123.

Figure 11B:
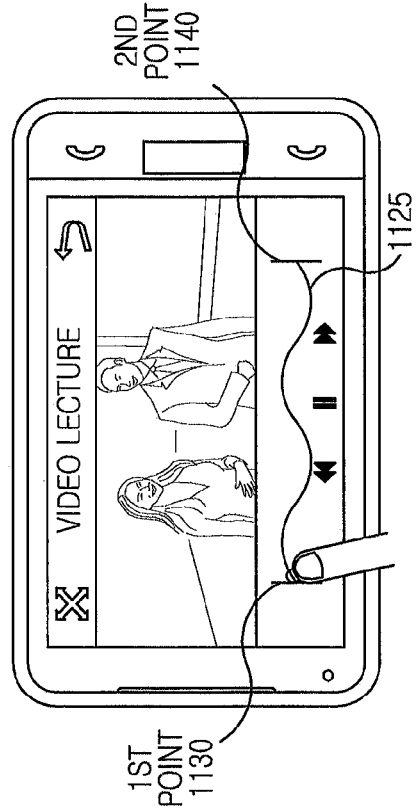

If a precision search event occurs, the image display device determines a precision navigation section ranging from a first point 1130 to a second point 1140, based on drag information of the image navigation bar 1121 as illustrated in FIG. 11B. In detail, the image display device sets the first point 1130 according to drag information generated from the left end of the image navigation bar 1121, and sets the second point 1140 according to drag information generated from the right end of the image navigation bar 1121. In an embodiment, the image display device sets the precision navigation section ranging from the first point 1130 to the second point 1140, based on the first point 1130 and the second point 1140.

Figure 11C:
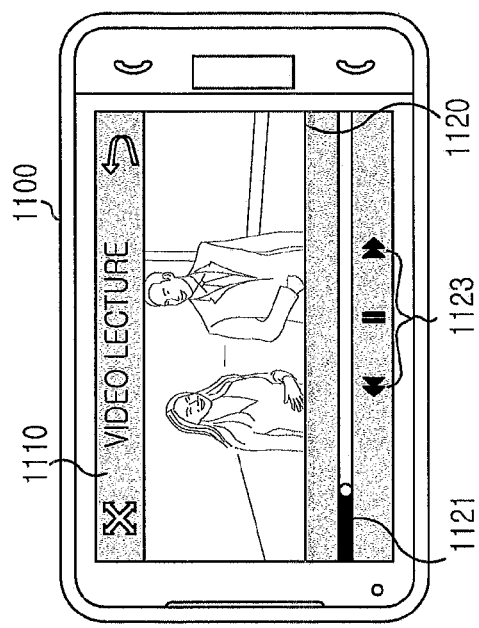
Figure 11D:
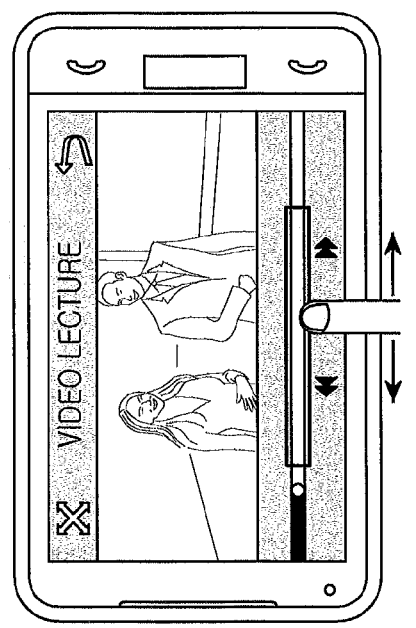

After identifying the precision navigation section ranging from the first point 1130 to the second point 1140, the image display device displays the precision navigation bar 1125, which is matched with the precision navigation section ranging from the first point 1130 to the second point 1140, on the image navigation region 1120 as illustrated in FIG. 11D. After that, the image display device can search for a playback timing of the video content included in the precision navigation section ranging from the first point 1130 to the second point 1140, based on touch information on the precision navigation bar 1125. Here, the precision navigation bar 1125 is displayed in a form in which a length of the image navigation bar 1121 is extended so as to precisely search for the precision navigation section ranging from the first point 1130 to the second point 1140.

As described above, an image display device sets an image navigation section ranging from a first point 1130 to a second point 1140, based on drag information about an image navigation bar 1121. In an embodiment, as illustrated in FIG. 11C, the image display device can change a position of the precision navigation section ranging from the first point 1130 to the second point 1140, based on touch information on the precision navigation section ranging from the first point 1130 to the second point 1140 of the image navigation bar 1121. For example, when a touch on the precision navigation section ranging from the first point 1130 to the second point 1140 of the image navigation bar 1121 is held for a reference time or longer, the image display device activates a precision navigation section shift mode. After that, the image display device changes the position of the precision navigation section ranging from the first point 1130 to the second point 1140 to the left or right, based on drag information about the precision navigation section ranging from the first point 1130 to the second point 1140.

FIGS. 12A to 12D illustrate screen configurations for extending a navigation length of a navigation bar according to a second embodiment of the present disclosure.

If an image display device plays video content, the image display device displays a playback screen 1200 of the video content on a display unit 110 as illustrated in FIG. 12A. In an embodiment, when a navigation event takes place, the image display device displays an image information region 1210 and an image navigation region 1220 on the display unit 110 as illustrated in FIG. 12A. Here, the image navigation region 1220 includes an image navigation bar 1221 and an image navigation button 1223.

If a precision search event occurs, the image display device determines a precision navigation section ranging from a first point 1230 to a second point 1240, based on drag information of the image navigation bar 1221 as illustrated in FIG. 12B. In detail, the image display device sets the first point 1230 according to drag information generated from a reference point of the image navigation bar 1221 to the left side thereof, and sets the second point 1240 according to drag information generated from the reference point of the image navigation bar 1221 to the right side thereof. In an embodiment, the image display device sets the precision navigation section ranging from the first point 1230 to the second point 1240, based on the first point 1230 and the second point 1240. Here, the reference point represents at least one first touch point of a user for setting the precision navigation section in the image navigation bar 1221.

After identifying the precision navigation section ranging from the first point 1230 to the second point 1240, the image display device displays the precision navigation bar 1225, which is matched with the precision navigation section ranging from the first point 1230 to the second point 1240, on the display unit 110 as illustrated in FIG. 12D. After that, the image display device can search for a playback timing of the video content included in the precision navigation section ranging from the first point 1230 to the second point 1240, based on touch information on the precision navigation bar 1225. Here, the precision navigation bar 1225 is displayed in a form in which a length of the image navigation bar 1221 is extended so as to precisely search for the precision navigation section ranging from the first point 1230 to the second point 1240.

As described above, an image display device sets an image navigation section ranging from a first point 1230 to a second point 1240, based on drag information about an image navigation bar 1221. In an embodiment, as illustrated in FIG. 12C, the image display device can change a position of the precision navigation section ranging from the first point 1230 to the second point 1240, based on touch information on the precision navigation section ranging from the first point 1230 to the second point 1240 of the image navigation bar 1221. For example, when a touch on the precision navigation section ranging from the first point 1230 to the second point 1240 of the image navigation bar 1221 is held for a reference time or longer, the image display device activates a precision navigation section shift mode. After that, the image display device changes the position of the precision navigation section ranging from the first point 1230 to the second point 1240 to the left or right, according to drag information about the precision navigation section ranging from the first point 1230 to the second point 1240.

FIGS. 13A to 13D illustrate screen configurations for extending a navigation length of a navigation bar according to a third embodiment of the present disclosure.

If an image display device plays video content, the image display device displays a playback screen 1300 of the video content on a display unit 110 as illustrated in FIG. 13A. In an embodiment, when a navigation event takes place, the image display device displays an image information region 1310 and an image navigation region 1320 on the display unit 110 as illustrated in FIG. 13A. Here, the image navigation region 1320 includes an image navigation bar 1321 and an image navigation button 1323.

If a precision search event occurs, the image display device determines a precision navigation section ranging from a first point 1330 to a second point 1340, based on multi touch information of the image navigation bar 1321 as illustrated in FIG. 13B. In detail, the image display device sets the precision navigation section ranging from the first point 1330 to the second point 1340, based on the first point 1330 and the second point 1340 that are multi touch points of the image navigation bar 1321.

After identifying the precision navigation section ranging from the first point 1330 to the second point 1340, the image display device displays the precision navigation bar 1325, which is matched with the precision navigation section ranging from the first point 1330 to the second point 1340, on the image navigation region 1320 as illustrated in FIG. 13D. After that, the image display device can search for a playback timing of the video content included in the precision navigation section ranging from the first point 1330 to the second point 1340, based on touch information on the precision navigation bar 1325. Here, the precision navigation bar 1325 is displayed in a form in which a length of the image navigation bar 1321 is extended so as to precisely navigate the precision navigation section ranging from the first point 1330 to the second point 1340.

As described above, an image display device sets an image navigation section ranging from a first point 1330 to a second point 1340, based on multi touch information about an image navigation bar 1321. In an embodiment, as illustrated in FIG. 13C, the image display device can change a position of the precision navigation section ranging from the first point 1330 to the second point 1340, based on touch information on the precision navigation section ranging from the first point 1330 to the second point 1340 of the image navigation bar 1321. For example, when a touch on the precision navigation section ranging from the first point 1330 to the second point 1340 of the image navigation bar 1321 is held for a reference time or longer, the image display device activates a precision navigation section shift mode. After that, the image display device changes the position of the precision navigation section ranging from the first point 1330 to the second point 1340 to the left or right, according to drag information about the precision navigation section ranging from the first point 1330 to the second point 1340.

FIGS. 14A to 14D illustrate screen configurations for extending a navigation length of a navigation bar according to a fourth embodiment of the present disclosure.

Figure 14A:
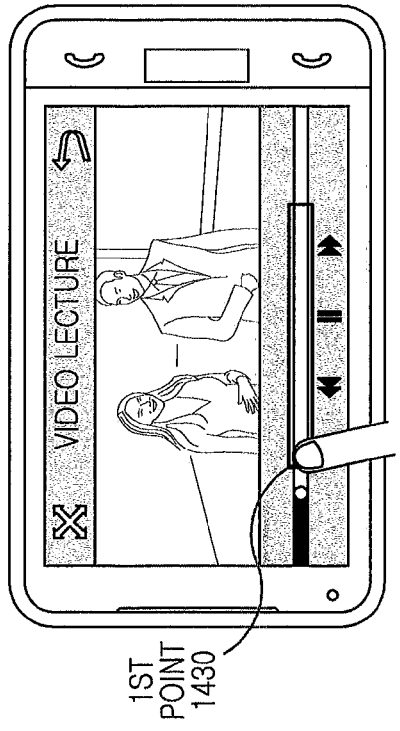
FIGS. 14A to 14D are diagrams illustrating screen configurations for extending a navigation length of a navigation bar according to a fourth embodiment of the present disclosure.

If an image display device plays video content, the image display device displays a playback screen 1400 of the video content on a display unit 110 as illustrated in FIG. 14A. In an embodiment, when a navigation event takes place, the image display device displays an image information region 1410 and an image navigation region 1420 on the display unit 110 as illustrated in FIG. 14A. Here, the image navigation region 1420 includes an image navigation bar 1421 and an image navigation button 1423.

Figure 14B:
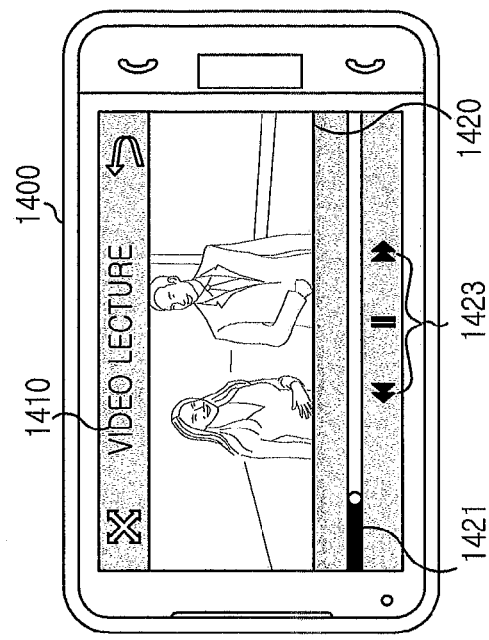
Figure 14C:
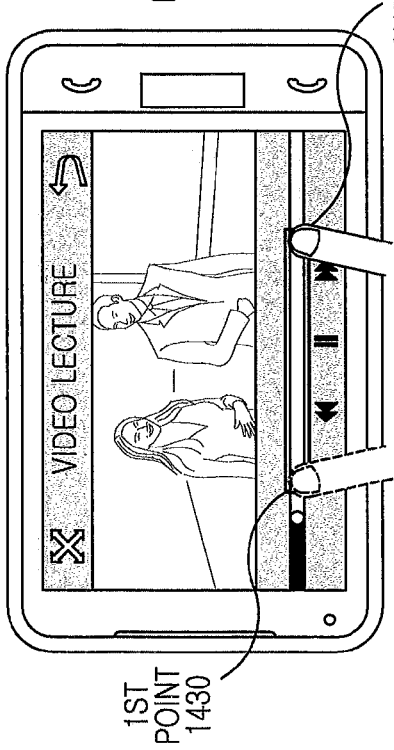

If a precision search event occurs, the image display device determines a precision navigation section ranging from a first touch point 1430 to a second touch point 1440, based on touch information of the image navigation bar 1421 as illustrated in FIG. 14B and FIG. 14C. In detail, the image display device sets the precision navigation section ranging from the first point 1430 to the second point 1440, based on the first touch point 1430 of the image navigation bar 1421 illustrated in FIG. 14B and the second touch point 1440 of the image navigation bar 1421 illustrated in FIG. 14C.

Figure 14D:
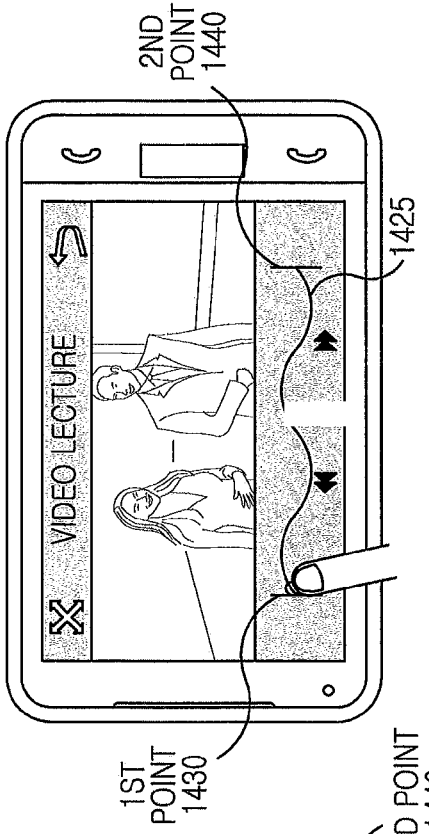

After identifying the precision navigation section ranging from the first touch point 1430 to the second touch point 1440, the image display device displays the precision navigation bar 1425 matched with the precision navigation section ranging from the first touch point 1430 to the second touch point 1440, on the image navigation region 1420 as illustrated in FIG. 14D. After that, the image display device can search for a playback timing of the video content included in the precision navigation section ranging from the first touch point 1430 to the second touch point 1440, based on touch information on the precision navigation bar 1425. Here, the precision navigation bar 1425 is displayed in a form in which a length of the image navigation bar 1421 is extended so as to precisely search for the precision navigation section ranging from the first touch point 1430 to the second touch point 1440.

As described above, an image display device sets an image navigation section ranging from a first touch point 1430 to a second touch point 1440, based on a number of times of touch information about an image navigation bar 1421. In an embodiment, the image display device can change a position of the precision navigation section ranging from the first touch point 1430 to the second touch point 1440, based on touch information on the precision navigation section ranging from the first touch point 1430 to the second touch point 1440 of the image navigation bar 1421. For example, when a touch on the precision navigation section ranging from the first touch point 1430 to the second touch point 1440 of the image navigation bar 1421 is held for a reference time or longer, the image display device activates a precision navigation section shift mode. After that, the image display device changes the position of the precision navigation section ranging from the first touch point 1430 to the second touch point 1440 to the left or right, based on drag information about the precision navigation section ranging from the first touch point 1430 to the second touch point 1440.

In the aforementioned embodiment, an image display device precisely searches for a playback timing of a video using a precision navigation bar.

Figure 15:
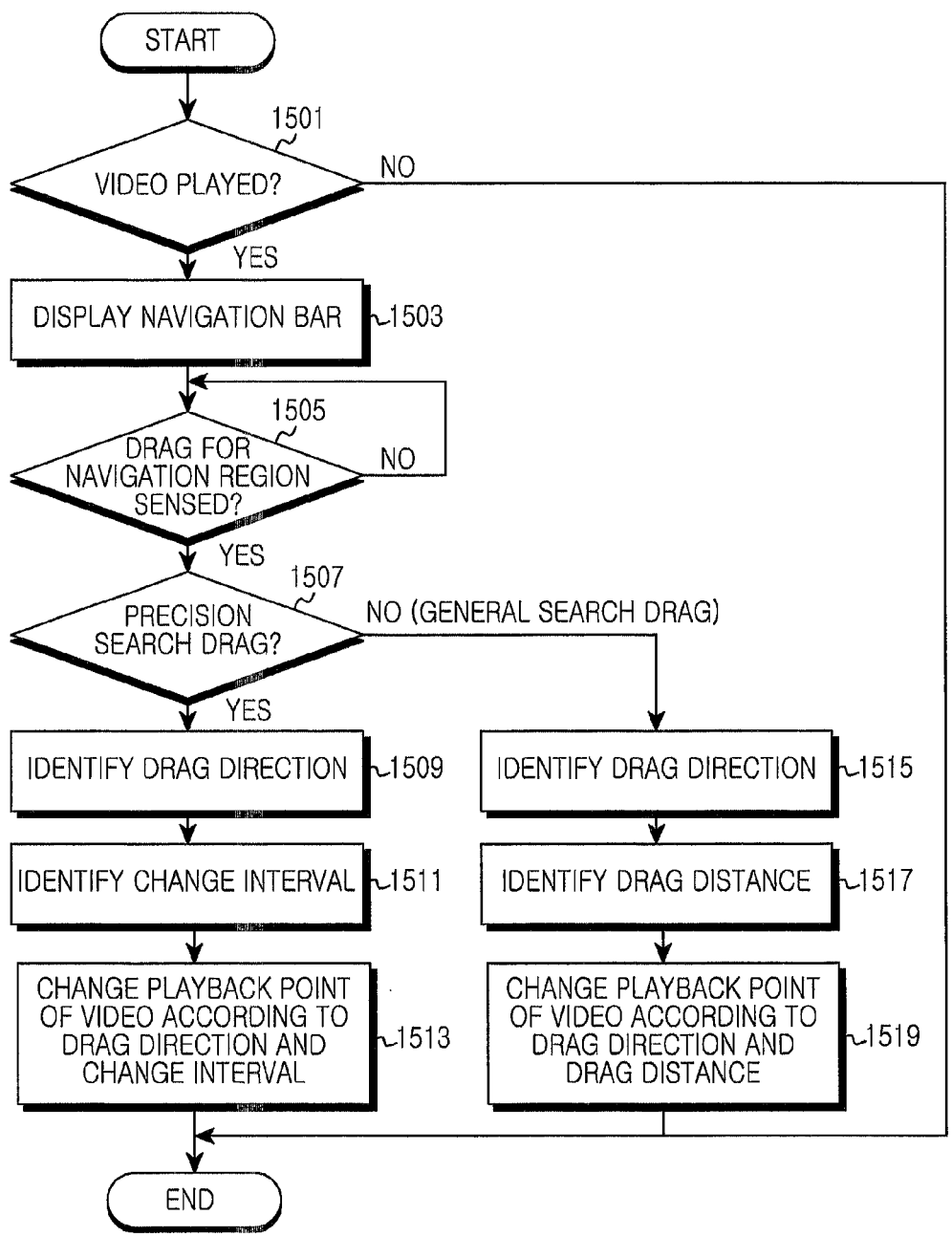
FIG. 15 is a flowchart illustrating a procedure for searching a playback timing of a video according to the kind of a gesture in an image display device according to an embodiment of the present disclosure.

In another embodiment, an image display device may precisely search for a playback timing of a video based on touch information on an image navigation bar as illustrated in FIG. 15 below.

FIG. 15 illustrates a procedure for searching a playback timing of a video according to a kind of gesture in an image display device according to an embodiment of the present disclosure.

Referring to FIG. 15, in operation 1501, the image display device determines whether to play video content. For example, the image display device determines if the video content for playing is selected by user's manipulation.

If it is determined not to play the video content in operation 1501, the image display device terminates the algorithm of the present disclosure.

In contrast, if it is determined to play the video content in operation 1501, the image display device proceeds to operation 1503 and displays a playback screen for the video content. For example, the image display device displays a playback screen 1600 of video content on a display unit 110 as illustrated in FIG. 16A. If a navigation event occurs, the image display device displays an image information region 1610 and an image navigation region 1620 on the display unit 110 as illustrated in FIG. 16A. Here, the image navigation region 1620 includes an image navigation bar 1621 and an image navigation button 1623.

After that, the image display device proceeds to operation 1505 and determines if a drag for an image navigation bar is sensed.

If it is determined in operation 1505 that the drag for the image navigation bar is sensed, the image display device proceeds to operation 1507 and determines if the sensed drag of operation 1505 is a precision search drag or a general search drag, based on a drag direction for the image navigation bar. For example, if a left or right drag for the image navigation bar is sensed as illustrated in FIG. 16B, the image display device recognizes that the general search drag takes place. In contrast, if an up or down drag for the image navigation bar is sensed as illustrated in FIG. 16C, the image display device recognizes that the precision search drag takes place.

If it is determined in operation 1507 that the precision search drag is sensed, the image display device proceeds to operation 1509 and determines the direction of the precision search drag (e.g., an up or down drag).

Next, the image display device proceeds to operation 1511 and determines a change interval. For example, the image display device determines a preset change interval. In an embodiment, the change interval can be changed by user's manipulation.

After determining the direction of the precision search drag and the change interval, the image display device proceeds to operation 1513 and changes a playback timing of the video content based on the direction of the precision search drag and the change interval. For example, when the change interval is set to three seconds and a precision search drag of down direction is sensed, the image display device changes the playback timing of the video content three seconds forward. For another example, when the change interval is set three seconds and a precision search drag of up direction is sensed, the image display device changes the playback timing of the video content three seconds backward.

In contrast, if it is determined in operation 1507 that the general search drag is sensed, the image display device proceeds to operation 1515 and determines the direction of the general search drag (e.g., a left or right drag).

Next, the image display device proceeds to operation 1517 and identifies a drag distance.

After identifying the direction of the general search drag and the drag distance, the image display device proceeds to operation 1519 and changes the playback timing of the video content based on the direction of the general search drag and the drag distance.

Next, the image display device terminates the algorithm of the present disclosure.

In the aforementioned embodiment, if a precision search touch is sensed, an image display device changes a playback timing of video content as much as a change interval. If a number of precision search touches are sensed consecutively, the image display device may change the playback timing of the video content based on the number of times of the precision search touch and a change interval resulting from one-time precision search touch. Also, if the precision search touch is held continuously, the image display device may increase the change interval according to a reference time interval.

As described above, an image display device changes a playback timing of video content according to a change interval that is preset to a touch or gesture for an image navigation bar. In an embodiment, the image display device has an advantage of being capable of adjusting the change interval and precisely searching the playback timing of the video content. Here, the touch includes a left or right drag, and the gesture includes an up or down drag and a circle touch.

Figure 17:
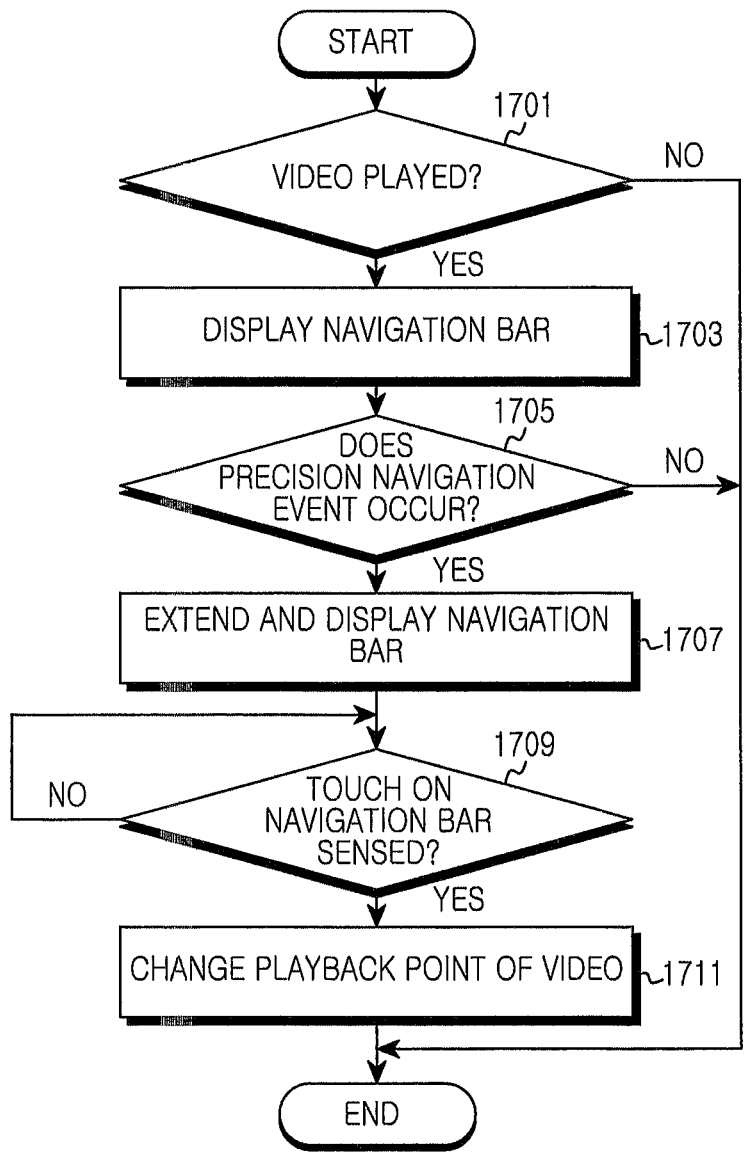
FIG. 17 is a flowchart illustrating a procedure for extending a navigation length of a navigation bar in an image display device according to an embodiment of the present disclosure.

FIG. 17 illustrates a procedure for extending a navigation length of a navigation bar in an image display device according to an embodiment of the present disclosure.

Referring to FIG. 17, in operation 1701, the image display device determines whether to play video content. For example, the image display device determines if the video content for playing is selected by user's manipulation.

If it is determined not to play the video content in operation 1701, the image display device terminates the algorithm of the present disclosure.

Figure 18A:
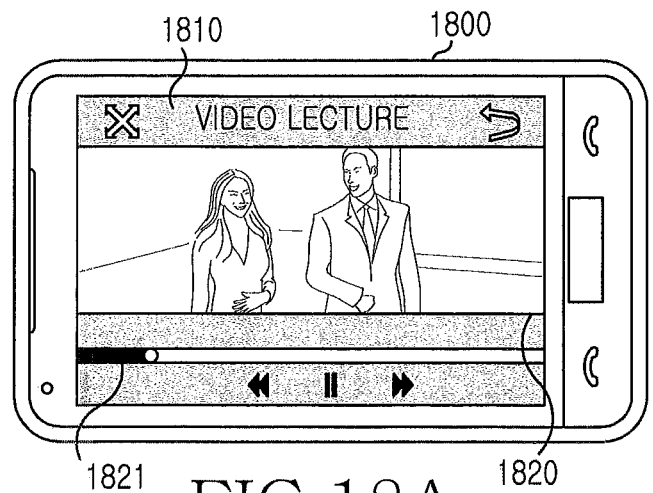
FIGS. 18A to 18C are diagrams illustrating screen configurations for extending a navigation length of a navigation bar according to a fifth embodiment of the present disclosure.

In contrast, if it is determined to play the video content in operation 1701, the image display device proceeds to operation 1703 and displays a playback screen for the video content. For example, the image display device displays a playback screen 1800 of video content on a display unit 110 as illustrated in FIG. 18A. If a navigation event occurs, the image display device displays an image information region 1810 and an image navigation region 1820 on the display unit 110 as illustrated in FIG. 18A. Here, the image navigation region 1820 includes an image navigation bar 1821 and an image navigation button.

Figure 18B:
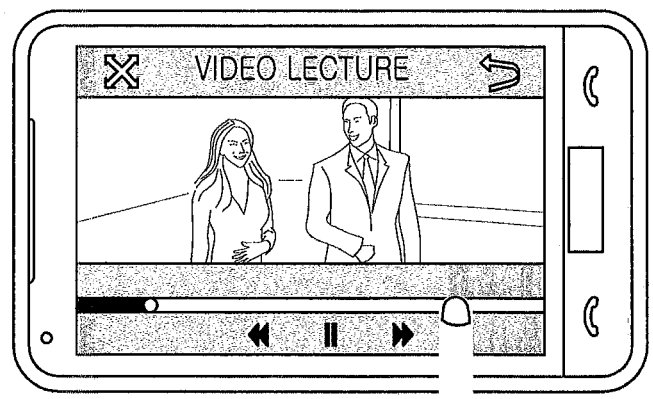

After that, the image display device proceeds to operation 1705 and determines if a precision navigation event takes place. For example, the image display device determines if a touch on a portion other than the image navigation bar in the image navigation region is sensed as illustrated in FIG. 18B. For another example, the image display device determines if the touch on the portion other than the image navigation bar in the image navigation region is held for a reference time or longer.

If it is determined in operation 1705 that the precision navigation event does not occur, the image display device terminates the algorithm of the present disclosure. If drag information about the image navigation bar included in the image navigation region is sensed, the image display device may change a playback timing of the video content based on the drag information about the image navigation bar.

Figure 18C:
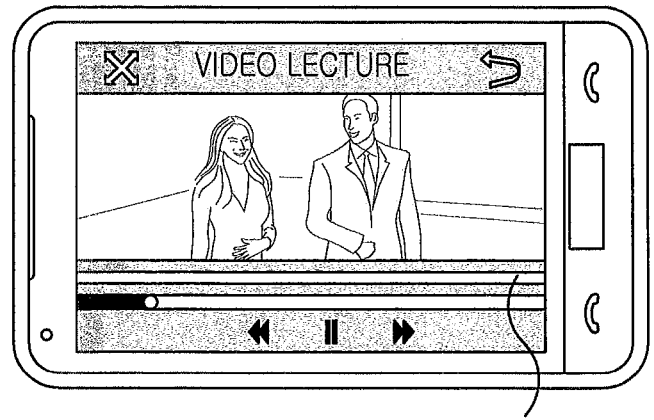

In contrast, if it is determined in operation 1705 that the precision navigation event occurs, the image display device proceeds to operation 1707 and extends and displays a length of the image navigation bar. For example, the image display device extends and displays (1823) a length of the image navigation bar as illustrated in FIG. 18C.

Next, the image display device proceeds to operation 1709 and determines if a touch on the extended image navigation bar is sensed.

If it is determined in operation 1709 that the touch on the extended image navigation bar is sensed, the image display device proceeds to operation 1711 and changes a playback point of the video content based on touch information on the extended image navigation bar. For example, when drag information about the extended image navigation bar is sensed, the image display device changes the playback point of the video content according to drag direction and distance. For another example, if any point of the extended image navigation bar is touched, the image display device may change the playback point of the video content based on the touch point of the extended image navigation bar.

After that, the image display device terminates the algorithm of the present disclosure.

It will be appreciated that embodiments of the present disclosure according to the claims and description in the specification can be realized in the form of hardware, software or a combination of hardware and software. Any such software may be stored in a non-transient computer readable storage medium. The computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, embodiments of the present disclosure have an advantage of, by providing a user interface for precisely searching a playback section of multimedia content in an image display device, being capable of precisely searching playback timing at multimedia content playing, and allowing a user to easily make a clear search for playback timing that the user wants.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method for searching a playback timing of multimedia content in an image display device, the method comprising:

playing multimedia content; and displaying an activated first image navigation bar and an inactivated second image navigation bar during the multimedia content playing;

detecting a touch input on the first image navigation bar;

determining a precision search section in the first image navigation bar based on the touch input;

matching the precision search section to the second image navigation bar;

activating the second image navigation bar;

detecting a touch input on the second image navigation bar; and changing a play timing of the multimedia content based on the touch input on the second image navigation bar;

wherein the precision search section is a portion of the first image navigation bar, and wherein a search scale of the second image navigation bar is different from a search scale of the first image navigation bar.

2. The method of claim 1, wherein displaying the first image navigation bar and the second image navigation bar comprises, when a touch on a playback region of the multimedia content is detected during the multimedia content playing, displaying the first image navigation bar and the second image navigation bar.

3. An image display device comprising:
a touch screen; and
a controller configured to:
control the touch screen to display an activated first image navigation bar and an inactivated second image navigation bar during a multimedia content playing;
detect a touch input on to the first image navigation bar;
determine a precision search section based on the touch input;
match the precision search section to the second image navigation bar;
activating the second image navigation bar;
detect a touch input on the second image navigation bar; and
change a play timing of the multimedia content based on the touch input on the second image navigation bar,
wherein the precision search section is a portion of the first image navigation bar,
wherein a search scale of the second image navigation bar is different from a search scale of the first image navigation bar.

4. The image display device of claim 3, wherein, when another touch on a playback region of the multimedia content is sensed during the multimedia content playing, the controller is configured to control the touch screen to display the first image navigation bar and the second image navigation bar.

* * * * *